United States Patent
Arekar et al.

(10) Patent No.: US 9,027,903 B2
(45) Date of Patent: May 12, 2015

(54) POWER-EFFICIENT ACTUATOR ASSEMBLIES AND METHODS OF MANUFACTURE

(75) Inventors: Chaitanya Arekar, San Diego, CA (US); Leonid Foshansky, San Diego, CA (US); Kyle James Ovard, Jr., San Diego, CA (US); Robert Bogursky, Encinitas, CA (US); George Marc Simmel, Cupertino, CA (US)

(73) Assignee: Autosplice, Inc., San Diego, CA (US)

( * ) Notice: Subject to any disclaimer, the term of this patent is extended or adjusted under 35 U.S.C. 154(b) by 16 days.

(21) Appl. No.: 13/149,508

(22) Filed: May 31, 2011

(65) Prior Publication Data

US 2012/0153043 A1 Jun. 21, 2012

Related U.S. Application Data

(60) Provisional application No. 61/423,481, filed on Dec. 15, 2010.

(51) Int. Cl.
| | |
|---|---|
| F16K 31/00 | (2006.01) |
| H02P 31/00 | (2006.01) |
| F16K 31/02 | (2006.01) |
| F16K 31/06 | (2006.01) |

(52) U.S. Cl.
CPC .............. *H02P 31/00* (2013.01); *F16K 31/025* (2013.01); *F16K 31/0644* (2013.01); *F16K 31/0675* (2013.01)

(58) Field of Classification Search
USPC .................................. 251/11, 129.06, 129.04
See application file for complete search history.

(56) References Cited

U.S. PATENT DOCUMENTS

| | | | |
|---|---|---|---|
| 2,209,233 A | * | 7/1940 | Moyer ............................ 322/25 |
| 2,983,898 A | | 5/1961 | Kalmar et al. |
| 3,038,347 A | | 6/1962 | Sloan et al. |
| 3,464,227 A | * | 9/1969 | Matthies ......................... 62/225 |
| 3,465,962 A | * | 9/1969 | Matulich et al. ................ 236/13 |
| 3,625,002 A | | 12/1971 | Davis |
| 3,974,844 A | | 8/1976 | Pimentel |
| 4,372,486 A | * | 2/1983 | Tomioka et al. ............ 236/92 B |
| 4,448,147 A | | 5/1984 | Dewaegheneire |
| 4,484,725 A | | 11/1984 | Yoshiga |
| 4,806,815 A | | 2/1989 | Honma |
| 4,819,682 A | | 4/1989 | Van Marcke |
| 5,020,601 A | | 6/1991 | Retzloff et al. |
| 5,039,061 A | | 8/1991 | Heard et al. |
| 5,169,117 A | | 12/1992 | Huang |
| 5,259,554 A | | 11/1993 | Ewing et al. |
| 5,397,053 A | | 3/1995 | Ewing et al. |
| 5,684,448 A | * | 11/1997 | Jacobsen et al. .............. 337/140 |

(Continued)

*Primary Examiner* — John K Fristoe, Jr.
*Assistant Examiner* — Umashankar Venkatesan
(74) *Attorney, Agent, or Firm* — Gazdzinski & Associates PC

(57) ABSTRACT

Power-efficient actuator apparatus and methods. In one exemplary embodiment, the actuator assembly utilizes a shape memory alloy (SMA) filament driven by an electronic power source to induce movement in the underlying assembly to actuate a load (e.g., water valve). In addition, a circuit board is included which allows the actuator assembly to be readily incorporated or retrofit into a wide range of systems such that the signal characteristics of the supply line can, among other applications, be conditioned in order to protect the SMA filament. Furthermore, the circuit board can also readily be adapted for use with "green" power sources such as photovoltaic systems and the like. Methods for manufacturing and utilizing the aforementioned actuator assembly are also disclosed.

23 Claims, 22 Drawing Sheets

(56) References Cited

U.S. PATENT DOCUMENTS

| | | |
|---|---|---|
| 5,758,863 A | 6/1998 | Buffet et al. |
| 5,865,418 A | 2/1999 | Nakayama et al. |
| 6,073,904 A | 6/2000 | Diller et al. |
| 6,247,678 B1 * | 6/2001 | Hines et al. ............ 251/11 |
| 6,279,869 B1 * | 8/2001 | Olewicz ............ 251/7 |
| 6,305,662 B1 * | 10/2001 | Parsons et al. ............ 251/129.04 |
| 6,739,574 B1 * | 5/2004 | Simon ............ 251/129.06 |
| 6,742,761 B2 | 6/2004 | Johnson et al. |
| 6,840,257 B1 | 1/2005 | Dario et al. |
| 6,843,465 B1 | 1/2005 | Scott |
| 6,959,904 B2 | 11/2005 | Beraldo |
| 7,055,793 B2 | 6/2006 | Biehl et al. |
| 7,093,817 B2 | 8/2006 | MacGregor et al. |
| 7,331,563 B2 | 2/2008 | Biehl et al. |
| 7,347,221 B2 | 3/2008 | Berger et al. |
| 7,506,663 B2 | 3/2009 | Thomas et al. |
| 7,650,914 B2 | 1/2010 | Bogursky et al. |
| 8,540,206 B2 | 9/2013 | Foshansky et al. |
| 2002/0171055 A1 | 11/2002 | Johnson et al. |
| 2005/0005980 A1 | 1/2005 | Eberhardt et al. |
| 2005/0172462 A1 | 8/2005 | Rudduck et al. |
| 2006/0043208 A1 | 3/2006 | Graham |
| 2006/0091342 A1 | 5/2006 | Butera et al. |
| 2007/0114968 A1 | 5/2007 | Krah et al. |
| 2007/0294873 A1 | 12/2007 | Bogursky |
| 2008/0173833 A1 | 7/2008 | Vyawahare et al. |
| 2009/0301573 A1 * | 12/2009 | Harrington et al. ........ 137/355.2 |
| 2010/0108922 A1 | 5/2010 | Foshansky et al. |
| 2012/0104292 A1 * | 5/2012 | Kollar et al. ............ 251/11 |
| 2012/0160334 A1 * | 6/2012 | Deperraz et al. ............ 137/13 |

* cited by examiner

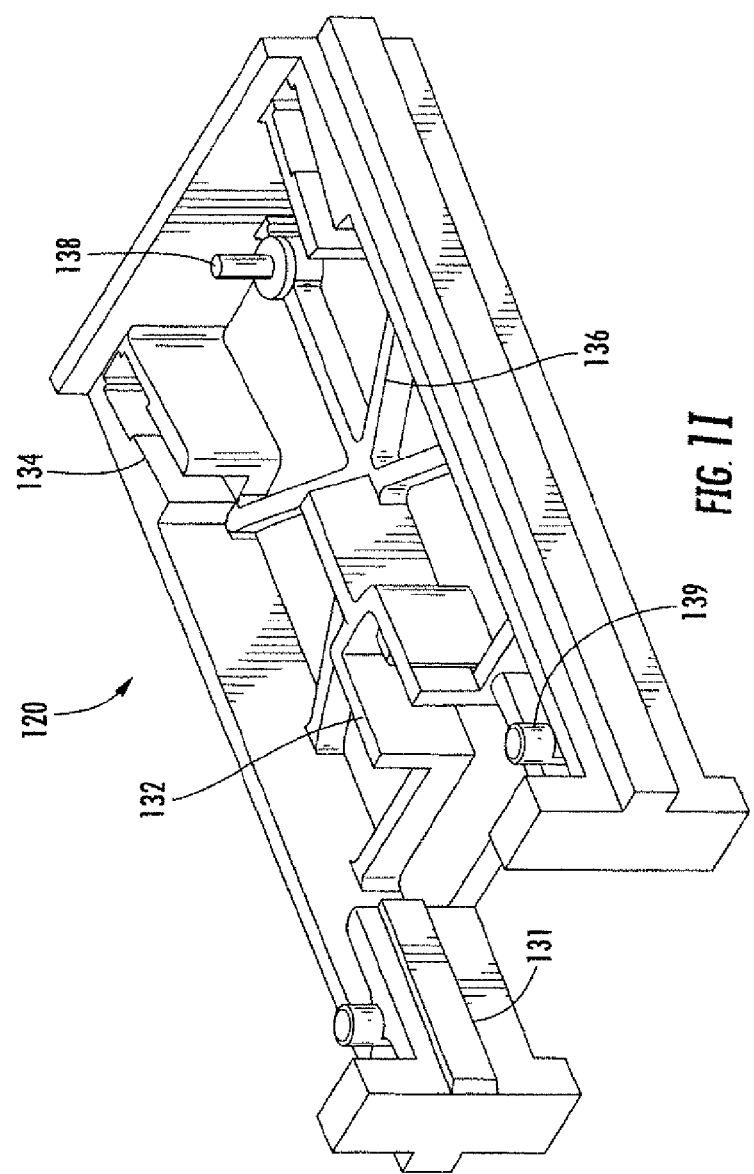

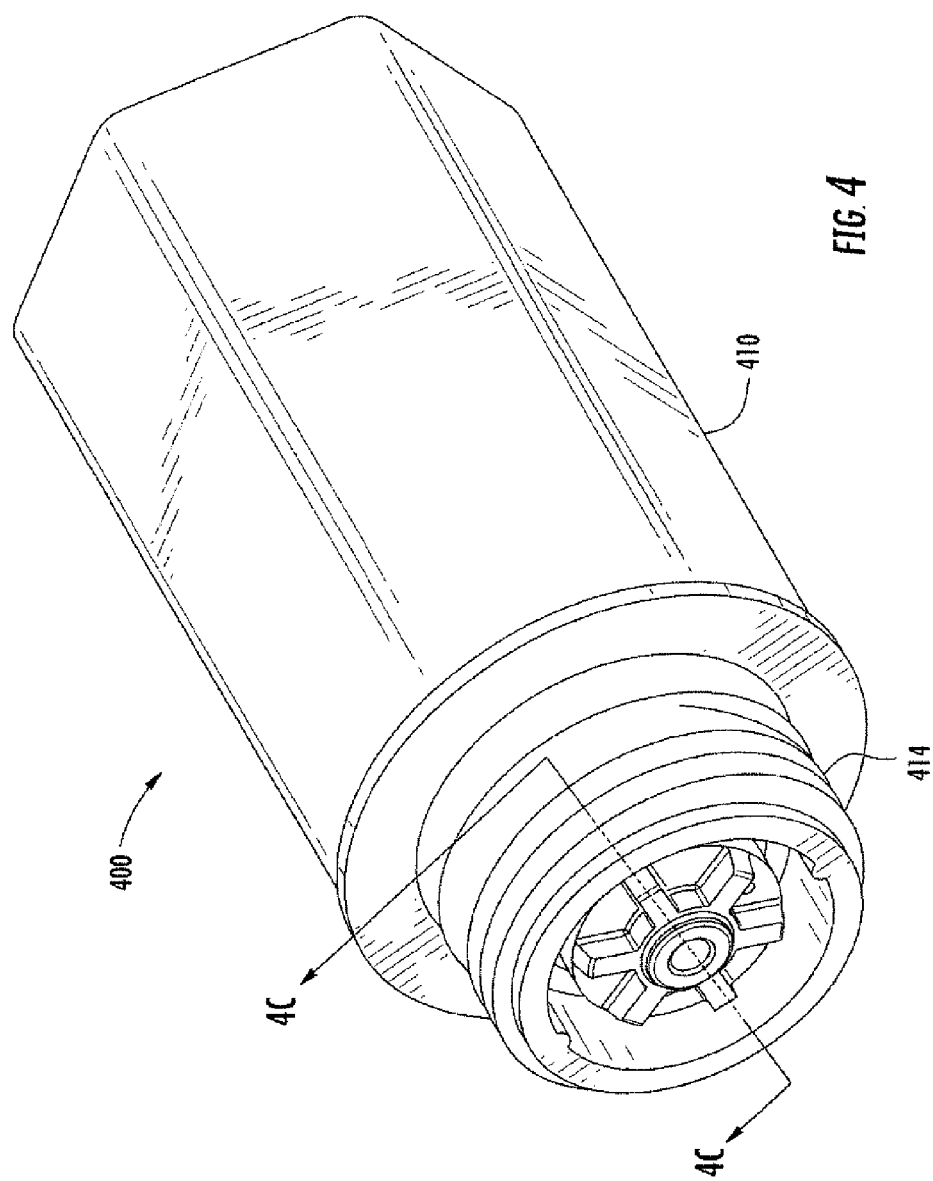

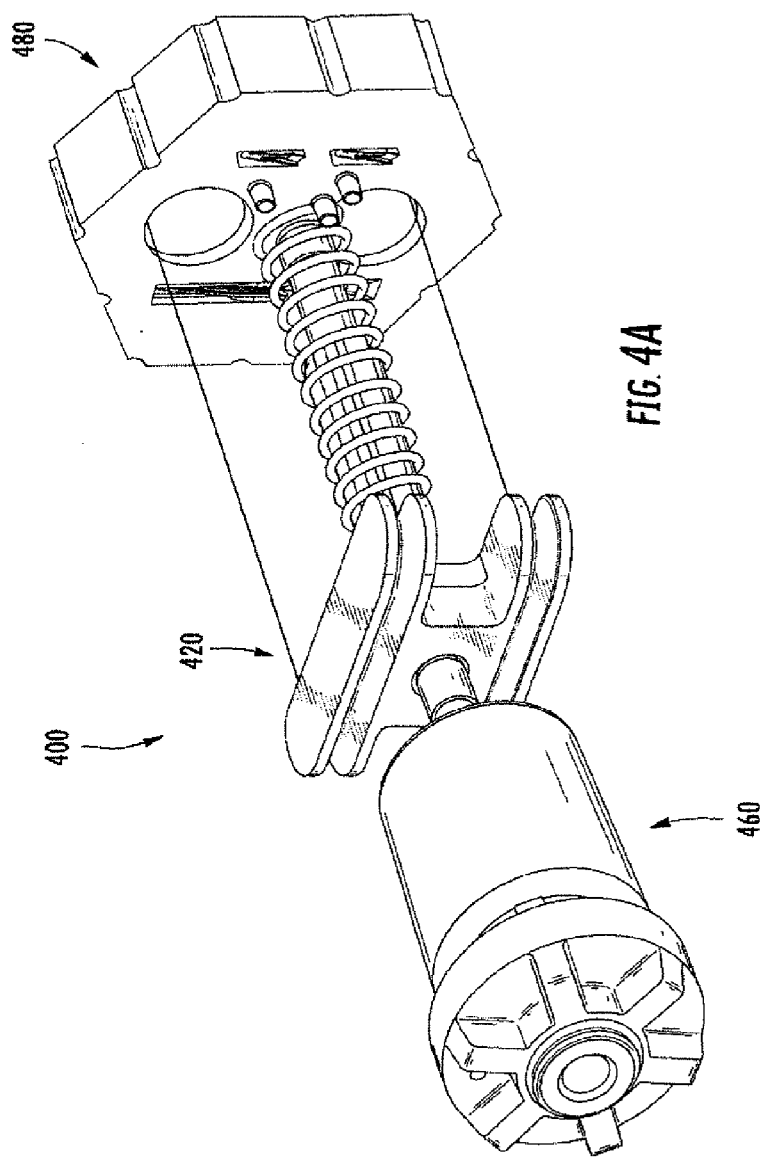

POWER-EFFICIENT ACTUATOR ASSEMBLIES AND METHODS OF MANUFACTURE

PRIORITY AND RELATED APPLICATIONS

This application claims priority to U.S. Provisional Patent Application Ser. No. 61/423,481 filed Dec. 15, 2010 entitled "Power-efficient actuator assemblies and methods of manufacture", which is incorporated herein by reference in its entirety.

This application is related to co-owned U.S. patent application Ser. No. 12/539,521 filed Aug. 11, 2009 and entitled "Multi-Stable Actuation Apparatus and Methods for Making and Using the Same" which claims priority to U.S. Provisional Patent Application Ser. No. 61/189,148 filed Aug. 14, 2008 of the same title, each of which is incorporated herein by reference in its entirety. This application is also related to co-owned U.S. Provisional Patent Application Ser. No. 61/206,883 filed Feb. 4, 2009 and entitled "Memory Alloy-Actuated Apparatus and Methods for Making and Using the Same", the contents of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to the area of actuators, and more specifically in one exemplary aspect, to an improved design for and methods of manufacturing and using an actuator or sensor apparatus which is actuated by thermally or electrically activated filament(s), such as a shape memory alloy (SMA) material.

DESCRIPTION OF RELATED TECHNOLOGY

Actuator assemblies are well known in a variety of industries, including such common applications such as wastewater treatment plants, power plants, manufacturing plants and refineries, as well as in certain consumer or residential devices. One common prior art apparatus for actuator-induced movement is a solenoid. A solenoid is a device that converts energy (e.g. electrical current, fluid pressure, etc.) into a linear actuation. An electromechanical solenoid typically comprises electrically conductive windings that are wrapped around a magnetic core. The windings produce a magnetic field when an electrical current is passed through it, thereby inducing the magnetic core to move. A pilot valve stem or other such parent apparatus is coupled to the magnet, thereby actuating a parent device. Other types of "solenoids" also exist, such as pneumatic or even hydraulic solenoids. One exemplary application for solenoids is via the integrated use of a solenoid to actuate a valve. These include anything from large, high pressure systems to smaller home or vehicle systems, including e.g., automatic flush toilets.

Numerous examples of solenoid actuators exist in the prior art including, for example, U.S. Pat. No. 7,347,221 to Berger, et al. issued Mar. 25, 2008 and entitled "SOLENOID VALVE", incorporated herein by reference in its entirety.

A common limitation with regards to electromechanical solenoids (particularly those that are used in small or portable consumer applications such as the aforementioned automatic flush toilets) is the fact that the actuating current is often generated via a series of batteries. Such batteries are often arranged in a series configuration, thereby adding the voltage of each cell while maintaining a common current through each. These solenoid actuators generally have comparatively large power requirements, and are often inefficient due to inter alia the internal resistance associated with the application of an electric current across the solenoid coils.

Furthermore, the reliability of prior art solenoid actuators is dependent upon each of the batteries in the aforementioned "series" power source delivering constant power; if any one of the batteries fails, the solenoid actuator cannot function since the current path is broken (i.e., the "dead" cell will not conduct).

In addition to solenoids, actuators can be coupled to so-called uni-stability or multi-stability mechanisms in order to assist with actuator assembly applications such as valves. In the present context, the terms "uni-stability" and "Multi-stability refers respectively to the ability of an object to exist in one or multiple (e.g., two or more) stable states. Little or no energy is required to maintain an object in any one of the two stable states (e.g., two states of a bistable object). However, activation energy is required for the object to be displaced from a stable state (e.g., switch between the two given stable states).

Bistable mechanisms have been utilized for various functions in the prior art, including valves. Examples of bistable mechanisms are disclosed at, for example, U.S. Pat. No. 6,959,904 to Beraldo issued Nov. 1, 2005 and entitled "Solenoid valve device of the bistable type, particularly for controlling the supply of water to a washing machine"; and U.S. Pat. No. 7,331,563 to Biehl, et al. issued Feb. 19, 2008 and entitled "Valve with compact actuating mechanism".

Shaped Memory Alloy

Similarly, the use of thermally or electrically sensitive materials such as shaped memory alloy (SMA) for various purposes including device actuation is also well known. SMA generally comprises a metal that is capable of "remembering" or substantially reassuming a previous geometry or physical condition. For example, after it is deformed, it can either substantially regain its original geometry by itself during e.g., heating (i.e., the "one-way effect") or, at higher ambient temperatures, simply during unloading (so-called "pseudo-elasticity"). Some examples of shape memory alloys include nickel-titanium ("NiTi" or "Nitinol") alloys and copper-zinc-aluminum alloys.

SMAs often find particular utility in a variety of mechanical systems including, for example, U.S. Pat. No. 6,840,257 to Dario, et al. issued Jan. 11, 2005 and entitled "Proportional valve with shape memory alloy actuator"; U.S. Pat. No. 6,843,465 to Scott, issued Jan. 18, 2005 and entitled "Memory wire actuated control valve"; U.S. Pat. No. 7,055,793 to Biehl, et al., issued Jun. 6, 2006 and entitled "Valve with compact actuating mechanism"; and United States Patent Publication No. 20050005980, to Eberhardt, et al. published Jan. 13, 2005 and entitled "Multiway valve", each of the foregoing being incorporated herein by reference in its entirety.

Despite the foregoing wide variety of actuation approaches and configurations in the prior art, there remains an unsatisfied need for improved actuator apparatus and methods that are: (1) both backwards-compatible with existing system infrastructure; and (2) readily adaptable for use with newer technologies that take advantage of, inter cilia, renewable energy resources. Ideally, such improved methods and apparatus would provide operating cost advantages over prior art technologies while minimizing implementation and deployment costs to the end customer.

SUMMARY OF THE INVENTION

The invention satisfies the aforementioned needs by providing improved actuator or sensor apparatus which is actuated by a shape memory alloy (SMA) material.

In a first aspect of the invention, exemplary actuator apparatus is disclosed. In one embodiment, the actuator is configured to operate in a system configured to be operated by a different type of actuator mechanism. The actuator includes an electrically activated actuator assembly and an electronic circuit configured to condition electrical power provided by the system for the different type of actuator mechanism so as to be suitable for use with the electrically activated actuator assembly.

In a second aspect of the invention, a valve assembly is disclosed. In one embodiment, the valve assembly includes an electrically activated actuator assembly, a valve coupled to the electrically activated actuator assembly, a power source configured for an actuator mechanism of a different type and an electronic circuit configured to condition electrical power provided by the power source so as to be suitable for use with the electrically activated actuator assembly.

In a third aspect of the invention, an irrigation system is disclosed. In one embodiment, the irrigation system includes multiple actuators configured to operate in a system configured for operation by an actuator mechanism of a different type. The actuators include an electrically activated actuator assembly and an electronic circuit configured to condition electrical power provided by the system for the actuator mechanism of a different type so as to be suitable for use with the electrically activated actuator assembly. The irrigation system also includes a number of irrigation valves that are coupled to respective ones of the actuators, a power source configured to power the actuators, a distribution piping system that distributes water to individual ones of the irrigation valves and sprinklers that are operated using at least the actuators and the distribution piping system.

In a fourth aspect of the invention, methods of manufacturing the aforementioned apparatus is disclosed.

In a fifth aspect of the invention, methods of using the aforementioned apparatus is disclosed, In a sixth aspect of the invention, business methods associated with the aforementioned apparatus is disclosed.

In a seventh aspect of the invention, a circuit for use in the aforementioned apparatus is disclosed.

BRIEF DESCRIPTION OF THE DRAWINGS

The features, objectives, and advantages of the invention will become more apparent from the detailed description set forth below when taken in conjunction with the drawings, wherein:

FIG. 1I illustrates a perspective view of the frame assembly of the exemplary actuator assembly of FIG. 1.

FIG. 4 illustrates a perspective view of a second exemplary embodiment of an actuator assembly manufactured in accordance with the principles of the present invention.

FIG. 4A illustrates a perspective view of the internal components of the actuator assembly of FIG. 4.

DETAILED DESCRIPTION OF THE PREFERRED EMBODIMENT

Figure 1:
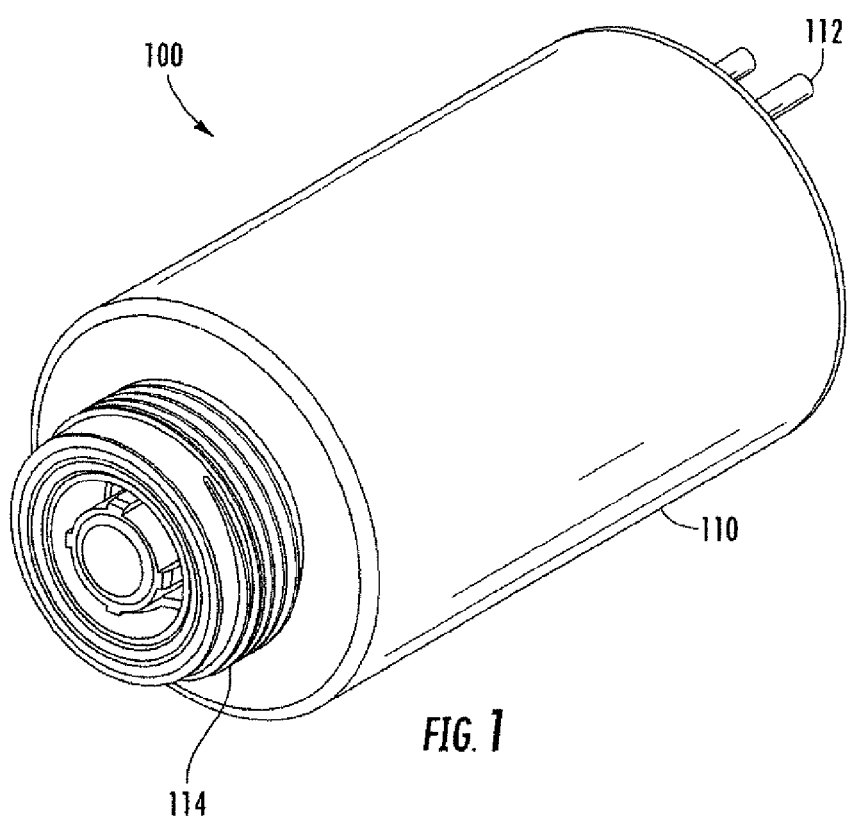
FIG. 1 illustrates a perspective view of a first exemplary actuator assembly manufactured in accordance with the principles of the present invention.

Reference is now made to the drawings wherein like numerals refer to like parts throughout.

As used herein, the terms "electrical component" and "electronic component" are used interchangeably and refer to components adapted to provide some electrical or electronic function, including without limitation, fuses, transformers, filters, inductors, capacitors, resistors, operational amplifiers, transistors and diodes, whether discrete components or integrated circuits, whether alone or in combination. In addition, other ancillary electronic devices such as for example, so-called EMI shields and the like, which could be considered passive in nature, are considered encompassed as possibilities within the meaning of this term.

As used herein, the term "filament" refers to any substantially elongate body, form, strand, or collection of the foregoing, including without limitation drawn, extruded or stranded wires or fibers, whether metallic or otherwise.

As used herein, the term "shape memory alloy" or "SMA" shall be understood to include, but not be limited to, any metal that is capable of "remembering" or substantially reassuming a previous geometry. For example, after it is deformed, it can either substantially regain its original geometry by itself during e.g., heating (i.e., the "one-way effect") or, at higher ambient temperatures, simply during unloading (so-called "pseudo-elasticity"). Some examples of shape memory alloys include nickel-titanium ("NiTi" or "Nitinol") alloys and copper-zinc-aluminum alloys.

Overview

In one aspect of the invention, improved actuator assembly apparatus is disclosed. The actuator assembly utilizes an SMA filament driven by an electronic power source to induce actuator movement in the underlying assembly. This actuator movement is, in a preferred embodiment, driven by the movement of a magnet which is physically isolated from the actuating plunger. Such a configuration is particularly useful in fluidic valve applications where the fluid in the valve is corrosive or could otherwise harm the electronic nature of the actuator assembly. Alternatively, the actuator movement is directly coupled to the actuating plunger.

In addition, a circuit is included which allows the SMA actuator assembly to be readily incorporated into a wide range of existing systems. For example, in an exemplary irrigation system where solenoid type valves have been previously used, the power supply for the system operates at a power level which can irreparably damage the SMA filament. The incorporated circuit thus allows the SMA actuator assembly to be incorporated into an otherwise incompatible power supply infrastructure. Furthermore, such a circuit could also readily be adapted for use with so-called green power sources such as photovoltaic systems and the like. Methods for manufacturing the aforementioned actuator assembly are also disclosed.

Detailed Description of Exemplary Embodiments

Exemplary embodiments of the apparatus and methods of the present invention are now described in detail with respect to FIGS. 1-4I. It will be appreciated that while described primarily in the context of an actuator assembly for use in conjunction with a sprinkler valve for, e.g., an irrigation system, the invention is in no way limited to sprinkler valves, irrigation, and/or water systems, and could be utilized for virtually any fluidic valve type application (e.g., liquid, gas, vapor, etc.). For example, the device and circuitry described subsequently herein could readily be modified for use in home appliances such as washing machines and the like that operate at, for example, 120V and higher.

Moreover, it will be appreciated that while the various embodiments shown and described herein have inherent benefits with respect to applications which use fluidic type valves, various aspects of the actuator assembly of the invention may readily be applied to literally any application requiring actuator-induced movement of one or more components. For example, embodiments of the invention described herein could readily be adapted for use in purely mechanical applications such as the actuation of a door latch or door lock, etc.
Exemplary Mechanical Configuration—

Figure 1A:
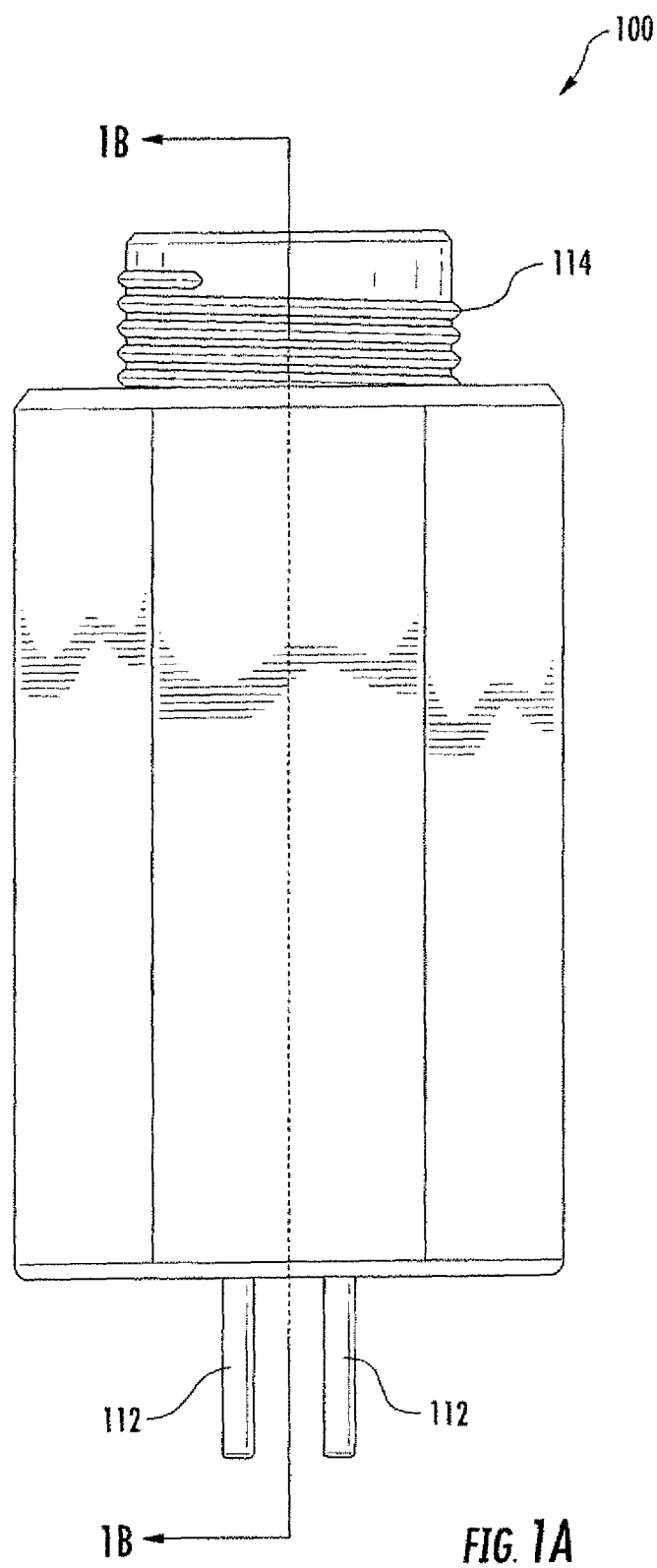
FIG. 1A is a top view of the actuator assembly of FIG. 1.

Referring to FIGS. 1-1A, a first embodiment of an actuator assembly 100 is shown and described in detail. Specifically, one implementation of the actuator assembly of FIG. 1 is intended as a replacement for a solenoid assembly mountable on, for example, existing irrigation valves. The actuator assembly of FIG. 1 includes an external housing 110 that is shaped and sized so as to be compatible with prior art solenoid actuator assemblies, although this is by no means a requirement. Moreover, while a substantially cylindrical outer housing 110 or shape is shown for the device 100, it is recognized that other shapes may be used consistent with the invention. For example, in one alternate embodiment, a substantially rectangular, planar shape is used, conforming substantially to the shape of the interior actuation assembly (see FIGS. 1C-1D). Yet other shapes and configurations will be recognized by those of ordinary skill given the present disclosure.

A valve interface 114 acts as a mating interface to the valve to which the assembly 100 is ultimately mounted and, in the illustrated example of FIG. 1, includes threads integrally molded into the housing 110. These threads are sized so as to, in an exemplary implementation, be compatible with existing irrigation valves. Other means of attachment or interface may be used as well consistent with the invention including, for example, flanges, welded or brazed seams, etc. Terminal conductors 112 protrude from the housing 110, and are intended to interface with an external power source (not shown). As will be described in more detail subsequently herein, these terminal conductors can interface with existing high current power sources (such as exemplary 24 VAC irrigation supply lines), or alternatively with relatively low current power sources such as batteries or renewable power sources such as a photovoltaic cell. While primarily envisioned as interfacing with external power sources, it is further recognized that these terminal conductors 112 could be obviated in lieu of internally mounted power sources (such as batteries, indigenous solar cells, inductive power transfer/charging systems, and the like).

Figure 1B:
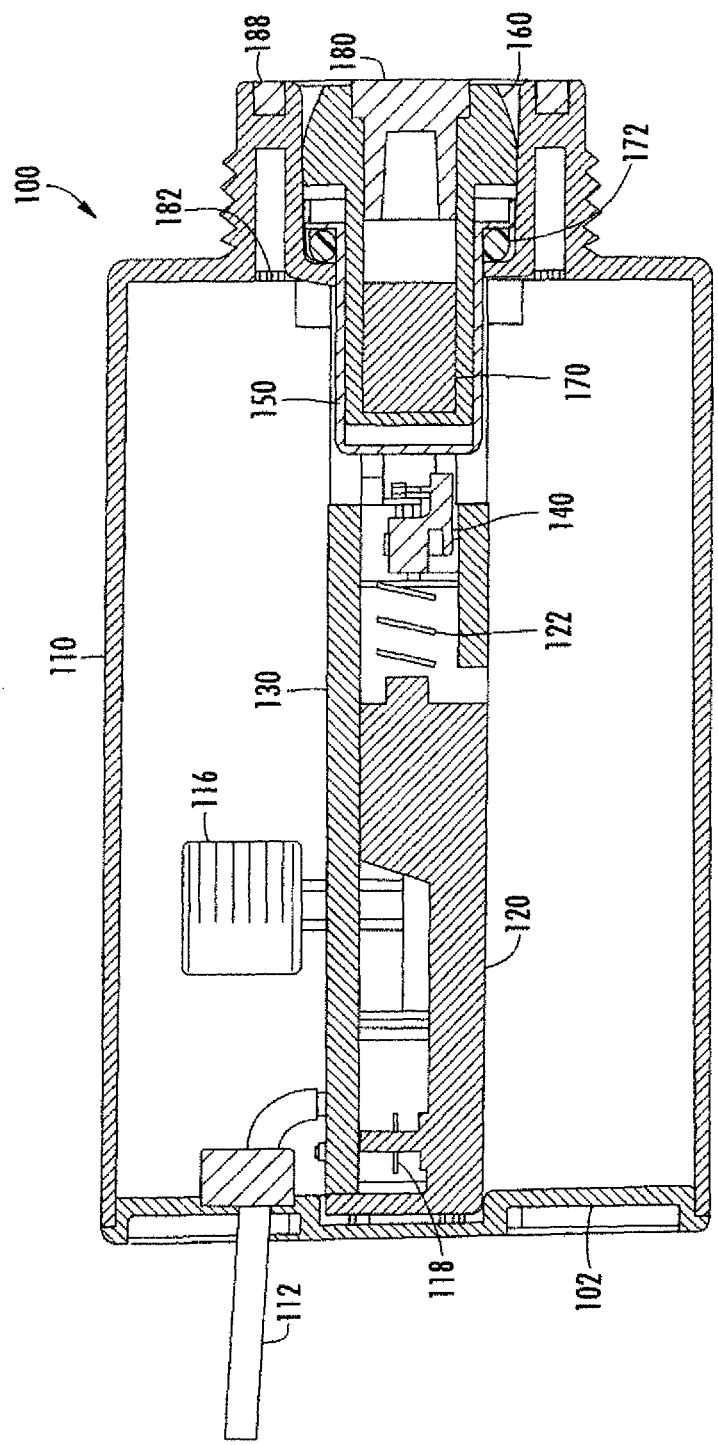
FIG. 1B illustrates a cross-sectional view of the actuator assembly of FIG. 1 taken along line 1B-1B of FIG. 1A.

FIG. 1B illustrates the actuator assembly 100, as shown in FIG. 1A, taken in cross section along line 1B-1B. FIG. 1B is particularly useful in illustrating the interrelation of the internal components of the actuator assembly, as will be described in subsequent detail with respect to FIGS. 1C-1J herein. The actuator assembly 100 encases the internal components via the use of a housing cover 110 and a housing end cap 102. The internal components are disposed on the actuator frame 120 which is coupled to a movable actuator slide element 140. The electronic components (including in the illustrated embodiment capacitor(s) 116) are disposed on a substrate 130 which is used to filter the power signal received via the terminal conductors 112, so as to apply a desired signal to the shape memory alloy (SMA) filament 126 (FIG. 1D). As will be discussed in detail below with respect to FIG. 2, the power signal from the external power source is modified so as to be compatible with the electrical requirements necessitated by the SMA filament 126. The valve interface 160 includes a fluid isolation element 150 with an associated O-ring 172. The combination of these two elements prevents the intrusion of fluids (such as water) from entering into the housing 110, and causing difficulties with sensitive components on the "dry side" of the actuator assembly (or permitting deleterious or even hazardous fluids to potentially escape from the actuator via the dry side). These difficulties include e.g., potential electrical problems such as shorting and/or shock hazards, and mechanical problems that result from the intrusion of corrosive fluids onto sensitive mechanical or electrical components. Notwithstanding, it will be appreciated that the fluidic boundary offered by the O-ring 172 and isolation element 150 of the illustrated embodiment may be differently located, and/or accomplished by other types of components (such as e.g., compression fittings, silicone or other gasket-type materials, etc.).

The fluid isolation element 150 is in the illustrated embodiment manufactured from an extruded sheet of metal, preferably a non-magnetic material such as a suitable grade of stainless steel. The plunger 180 interfaces with an associated pilot hole that is associated with the diaphragm of the fluidic valve to control the flow of fluid through the valve. The plunger 180 is actuated via the application of an applied magnetic force, as will be described more fully subsequently herein.

Figure 1C:
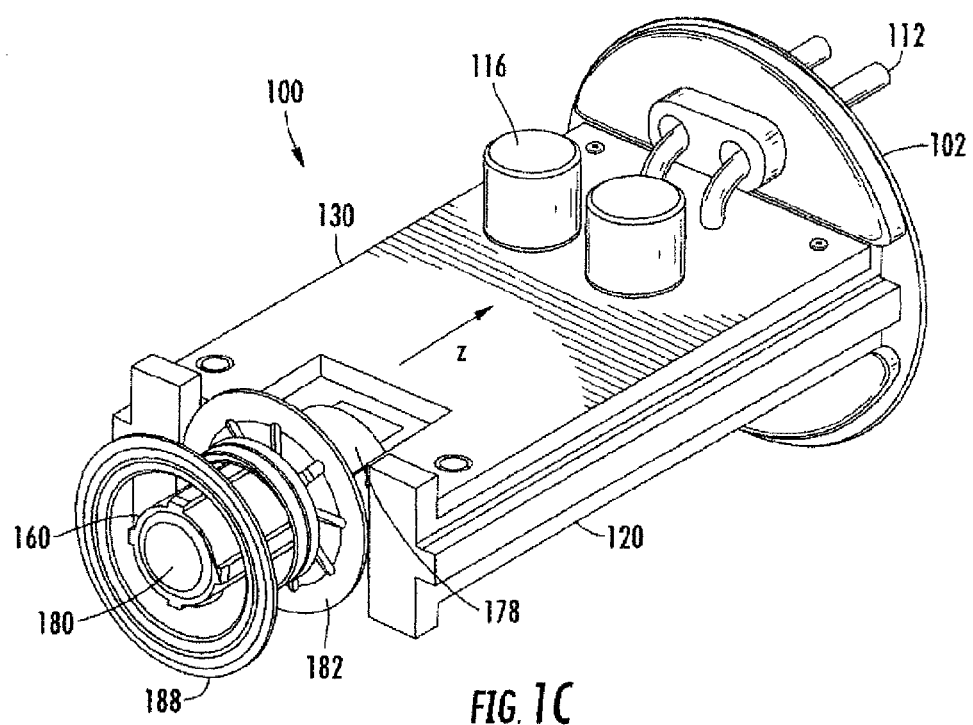
FIG. 1C illustrates a perspective view of the exemplary actuator assembly of FIG. 1 with the cover removed from view.
Figure 1D:
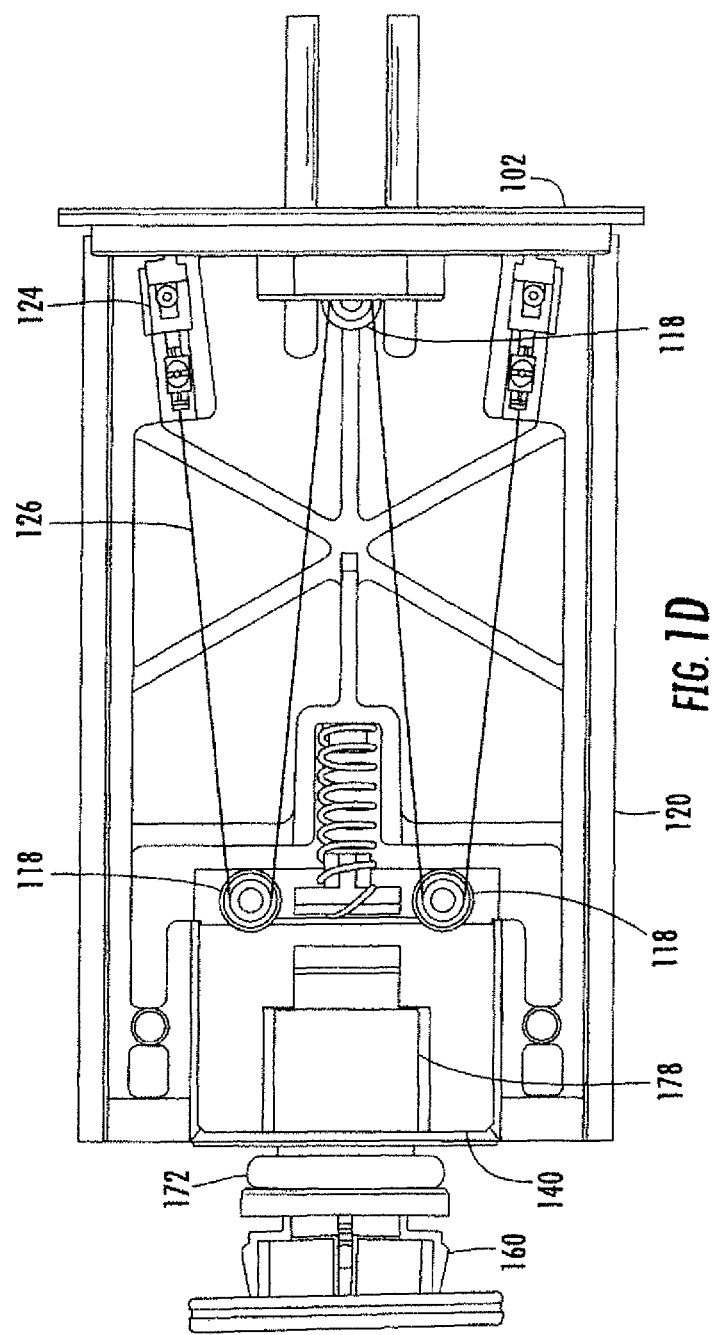
FIG. 1D is a top view of the actuator assembly of FIG. 1 with the cover and printed circuit board assembly removed from view.

Referring now to FIG. 1C, a perspective view of the actuator assembly 100 with the housing removed from view, so that the components that exist underneath the housing can more readily be seen, is provided. Of particular note are the various components present at or around the valve interface 160 of the actuator assembly. The spring washer 182 in the illustrated embodiment acts so as to apply a force in the z-direction (as shown in FIG. 1C) to, inter alia, the fluid isolation element 150 when compressed. In addition, the quad ring element 188 acts as an interface between the actuator assembly 100 and the valve to which it is intended to be attached. This feature 188 prevents the leakage of fluid at the valve interface. Other components, such as the actuator frame 120 with mounted substrate 130 having one or more electronic components 116 mounted thereon, are also visible in FIG. 1C.

FIG. 1D is a top elevation view of the actuator assembly 100, with the cover and substrate removed from view. Specifically, the present view illustrates inter alia, an exemplary advantage of the actuator assembly 100 over prior art implementations relating primarily to its implementation of the actuating shape memory alloy (SMA) filament 126. As can be seen, the SMA filament 126 is secured to the actuator frame 120 via the use of two (2) SMA clip anchors 124 (see FIG. 1J discussed infra). These SMA clip anchors are, in an exemplary embodiment, secured to the SMA filament via a serpentine-like channel crimp as disclosed in co-owned U.S. Pat. No. 7,650,914 filed Jun. 22, 2006 and entitled "Apparatus & Methods for Filament Bonding & Manufacturing", the contents of which are incorporated herein by reference in its entirety. The aforementioned serpentine-like channel crimps advantageously permit, inter alia, the crimping of very fine-gauge wire without damage thereto, and without any significant "creep". This solution also allows for very short-throw applications (i.e., short length filaments), since any significant creep in such short-length filaments can preclude actuation. Hence, the actuator assembly 100 of the invention can be made more compact and lower cost using such crimp solutions, although not a requirement of practicing the invention. The SMA clip anchors also act as an electrical interface between the electrical terminals 112 and the SMA filament.

The SMA filament 126 is in the illustrated embodiment routed via the use of three (3) different pulley elements 118, with one pulley element located on the SMA clip anchor 124 side, and the other two pulley elements 118 located on the opposite side adjacent the actuator slide element. These pulley elements 118 permit the SMA filament 126 to expand and contract freely without placing an undue stress on the relatively fragile SMA filament. The pulley arrangement shown also helps avoid the localization of mechanical stress within the filament; i.e., the use of one or more pulleys avoids friction at the point(s) where the filament changes direction, and prevents binding or bunching of the filament at these locations. The pulley arrangement also advantageously reduces the form factor requirements of the assembly 100, since an effective SMA filament length of approximately four (4) times that of a single straight run of filament is achieved by "snaking" the filament back and forth within the assembly from pulley to pulley.

While a pulley element system is illustrated, it is appreciated that other systems can be utilized in place of these pulley elements (such as low-friction posts, etc.) which minimize the risk of damage to the SMA filament during expansion/contraction. In addition, while three (3) pulley elements are shown, it is appreciated that more or less pulley elements could be readily incorporated into the actuator assembly design.

As noted above, a primary design consideration when choosing the number of pulley elements to utilize is with regards to the total run length of the filament 126. In the illustrated embodiment, the filament 126 is able to run the total length between the SMA clip anchor 124 end and the actuator slide element 140 a total of four (4) times. Accordingly, the actuator slide element travel distance ends up being approximately four (4) times the distance it would be if the filament only ran once between the clip anchor and the actuator slide element. For example, in one exemplary implementation of the illustrated embodiment, the total travel length is about sixty thousandths of an inch. Therefore the present invention possesses an inherent advantage over prior art designs via its use of multiple runs of filament via by enabling the ability to effectively multiply the travel distance of the actuator in a comparatively small overall package size.

The diameter size of the filament 126 can be readily modified based on design parameters of the actuator assembly. Smaller diameter filaments are faster to react to the application of current and require less energy to activate. Larger diameter SMA filaments tend to require longer reaction times and higher levels of applied current in order to operate; however, the larger diameter filaments apply larger amounts of force. Multiple-strand filaments may also be used consistent with the invention if desired.

Figure 1E:
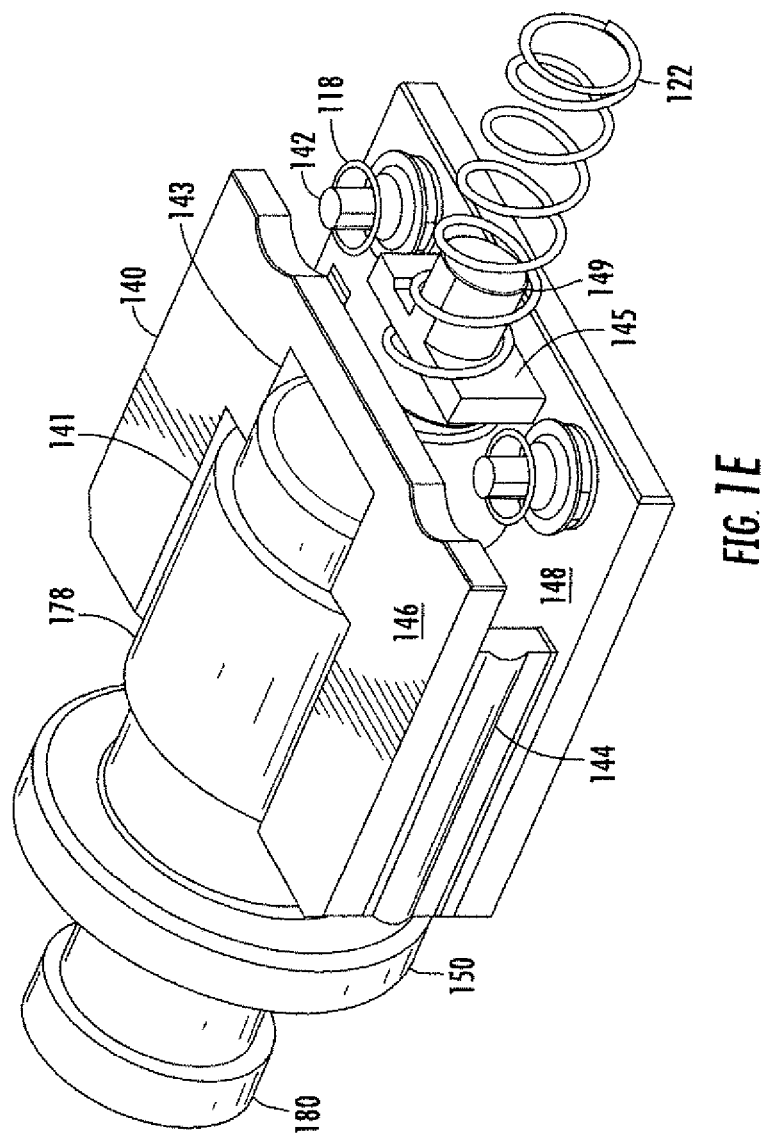
FIG. 1E illustrates a perspective view of the plunger actuating assembly of the exemplary actuator assembly of FIG. 1.

Referring now to FIG. 1E, the actuator slide element 140 and its associated components are illustrated as separated from the actuator frame. The actuator slide element itself is, in the illustrated embodiment, comprised of both an upper 146 and a lower surface 148. These upper and lower surfaces collectively form an inner cylinder retention groove 143 for holding/securing the fluid isolation element 150; and an outer cylinder retention groove 141 (elements 141a, 141b in FIG. 1H) for holding/securing the dry-side magnet 178. The dry-side magnet 178 manufactured as a relatively thin ring so as to concentrate the magnetic field being applied to the wet-side magnet, although other shapes may be used. For example, half-moon shaped magnets or horseshoe shaped magnets could be readily substituted if desired. Actuator slide guide elements 144, sandwiched between the upper and lower surfaces of the actuator slide element 140, act as an interface with the actuator frame thereby permitting the slide element to move in and out of the actuator frame. Positioned on the lower surface 148 is a spring retention element 145 with a spring retention post 149, both acting in concert to position the spring 122 between the actuator slide element 140 and the actuator frame. The spring 122 acts to push the actuator slide element 140 in an outward direction from the actuator frame when the SMA filament 126 is in the non-activated state. Accordingly, when the SMA filament has an electrical current applied thereto (or in other embodiments, is heated via a heat source), the SMA filament changes shape (i.e., contracts in length), thereby compressing the spring 122 and pulling the actuator slide element in towards the actuator frame. The pulley elements 118 are positioned over the pulley shaft 142 during assembly, and provide relatively frictionless pivot points for the SMA filament.

Figure 1F:
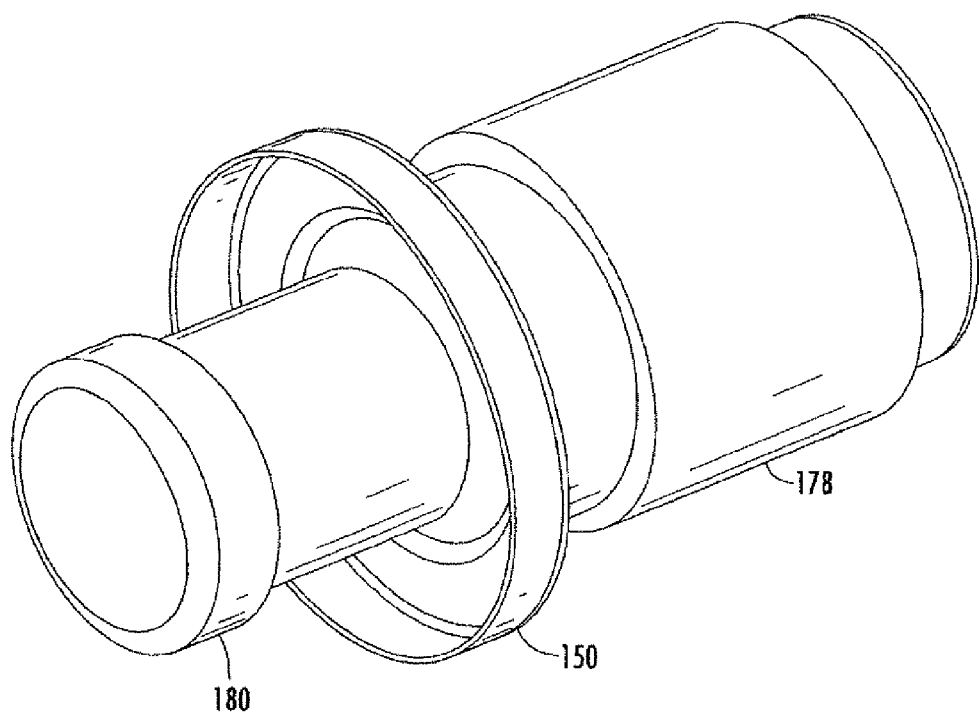
FIG. 1F illustrates a perspective view of the plunger assembly of the exemplary actuator assembly of FIG. 1.
Figure 1G:
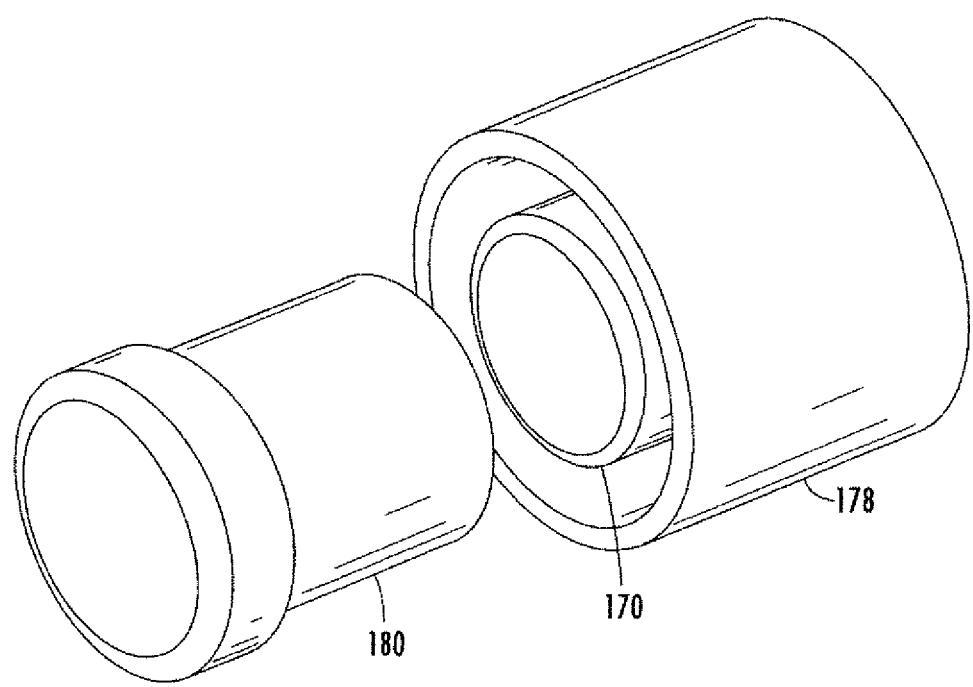
FIG. 1G illustrates a perspective view of the plunger assembly as illustrated in FIG. 1F with the fluid isolation element removed from view.

FIGS. 1F and 1G illustrate the various components which act to isolate the fluid and non-fluid sides of the actuator, while also acting to actuate the plunger 180 responsible for the control of fluid through an attached valve (not shown). As illustrated, the plunger 180 is preferably constructed from a polymer case that incorporates an elastomeric material to seal the pilot hole on the valve. In an exemplary embodiment, the polymer case includes a ferrous material or alternatively a magnet. The plunger is, in an exemplary embodiment, assembled as an insert molded unitary structure. However, it is appreciated that other assembly techniques could be readily substituted if desired. The plunger is received within the valve interface 160 (FIG. 1C), and is driven via its interface with an interior "wet-side" magnet 170. It should be noted the use of the term "wet-side magnet" herein only refers to the positioning of the magnet on the wet-side of the interface only, and in no way implies or requires that the magnet itself is in physical contact with the fluid traveling through the attached valve (although it may be in certain configurations if desired).

Furthermore, the magnet 170 is, in an exemplary embodiment, replaced by a material that produces a magnetic field only in response to an applied magnetic field (e.g. that applied by a permanent magnet). Accordingly, the term "magnet" as used herein refers not only to permanent magnets but those materials that produce a magnetic field in response to an applied magnetic field (or electrical current; e.g., an electromagnet). In addition, it is also envisioned that some embodiments may wish to incorporate the plunger and wet-side magnet into a unitary component such as that described in co-owned and co-pending U.S. patent application Ser. No. 12/969,143 entitled "Memory Alloy-Actuated Apparatus and Methods for Making and Using the same" filed Dec. 15, 2010, the contents of which are incorporated herein by reference in its entirety.

Figure 1H:
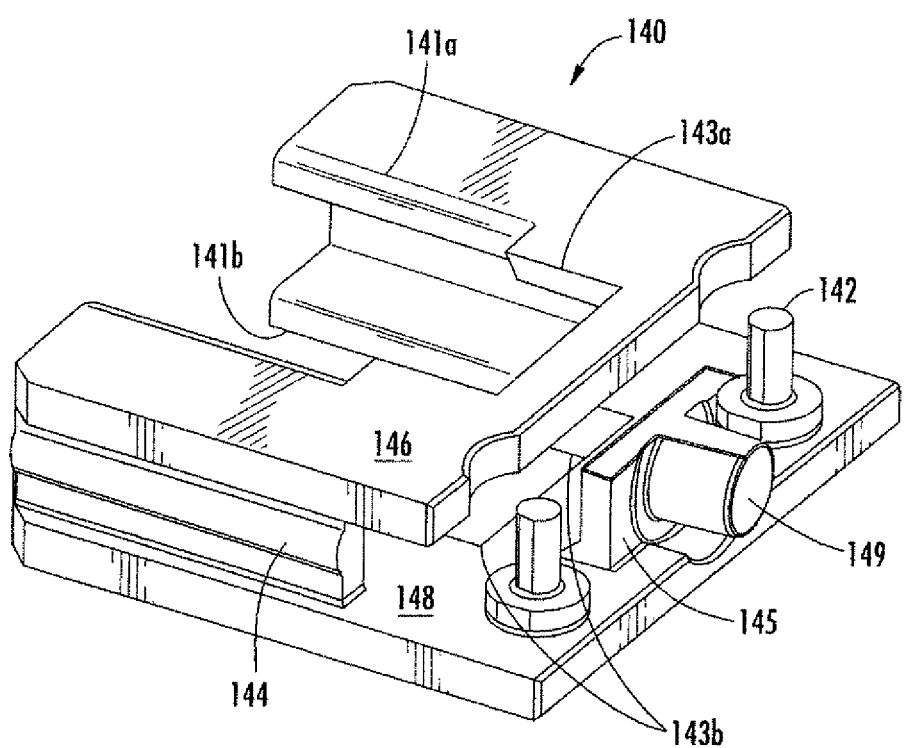
FIG. 1H illustrates a perspective view of the actuator slide element of the exemplary actuator assembly of FIG. 1.

Positioned externally to the fluid isolation element 150 is the dry-side magnet 178. The use of the term "dry-side" herein is only intended to denote that the magnet 178 is positioned relative to the fluid isolation element (i.e., on the exterior portion). As was discussed previously, the fluid isolation element in combination with the dry-side magnet is coupled to the actuator slide element 140. FIG. 1H illustrates the actuator slide element 140 without the fluid isolation element and dry-side magnet installed. Specifically, the outer cylinder retention groove (both upper 141a and lower 141b) and inner cylinder retention groove (upper 143a and lower 143b) geometry can be seen; from this, it is apparent how the fluid isolation element and dry-side magnet are secured. With regards to the actuation movement, as the filament 126 is heated it contracts, thereby pulling the actuator slide element 140 towards the actuator frame 120. The dry-side magnet 178 is pulled at the same time, and accordingly applies a magnetic field which permits the wet-side magnet 170 (and plunger 180) to shift from a closed valve position to an open valve position.

Referring now to FIG. 1I, the actuator frame 120 for use with the actuator assembly is illustrated unassembled from the other actuator assembly components. Specifically, various features which support the functionality of the device can now more easily be seen. For example, the pulley shaft 138 provides a structural post for the pulley element that provides a nearly frictionless pivot point for the SMA filament. The SMA clip anchor slots 134 house the SMA clip anchors (FIG. 1J), thereby securing the ends of the SMA filament. The spring slot 132 provides a receiving area for the spring that keeps the actuator slide element extended until an electrical current is applied to the SMA filament. The guide elements 131 on the fame interface with the actuator slide guide elements (FIG. 1H, element 144) thereby providing a surface upon which the actuator slide element 140 can freely move. The strengthening ribs 136 stiffen the actuator frame 120 to, inter alia, prevent the frame from twisting in such a way that would otherwise impede the movement of the actuator slide element. The substrate alignment posts 139 are used to position and maintain the substrate over the actuator frame.

Figure 1J:
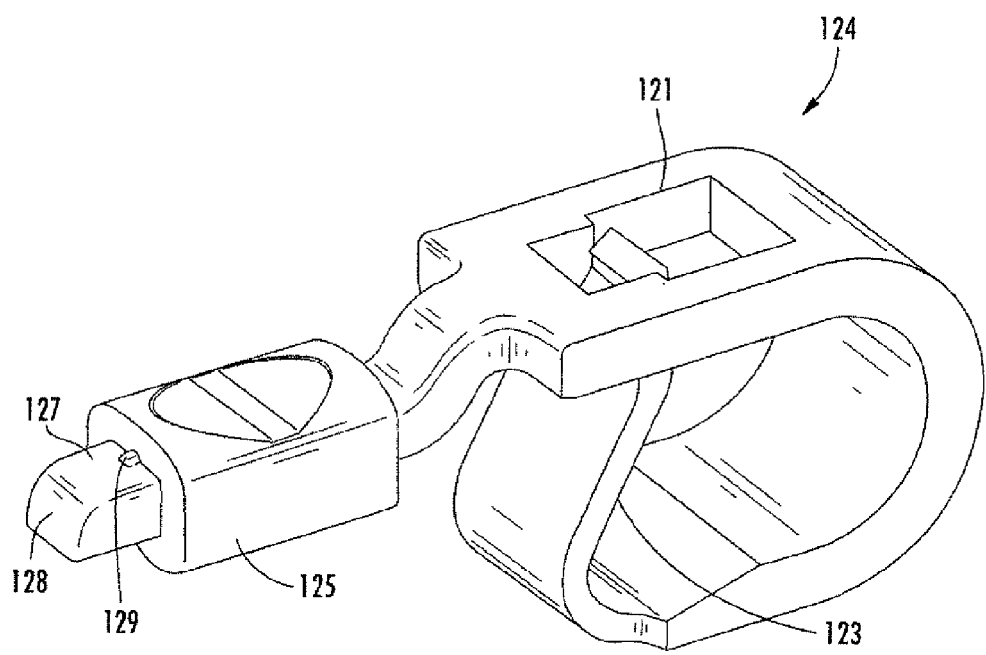
FIG. 1J illustrates a perspective view of the shape memory alloy (SMA) attachment clip of the exemplary actuator assembly of FIG. 1.

Referring now to FIG. 1J, an exemplary embodiment of an SMA clip anchor 124 is shown and described in detail. Specifically, the SMA clip anchor of FIG. 1J includes a contact portion comprised of a terminal receiving aperture 121 and a flexible contact arm 123 adapted to apply a normal force against any terminal received in the aperture. The SMA clip anchor is preferably constructed from a conductive material so as to transfer current originating from the terminal conductors (112, FIG. 1) to the SMA filament itself. Note also that the external periphery of the SMA clip anchor of the illustrated embodiment is sized so as to fit relatively securely within SMA clip anchor slot (134, FIG. 1I) of the actuator frame. At the SMA filament receiving end 127 of the SMA clip anchor, a crimping element 125 secures the filament to the SMA filament receiving end. In exemplary implementations, especially those that utilize fine gauge SMA filaments, the crimping features described in co-owned U.S. Pat. No. 7,650,914 previously incorporated and discussed herein, can be utilized in conjunction with the crimping element of FIG. 1J. Note also that the receiving portion 127 of the SMA clip anchor includes a rounded edge 128. This rounded edge is optionally included so as to prevent damaging the SMA filament during repeated actuation cycles.

Figure 2:
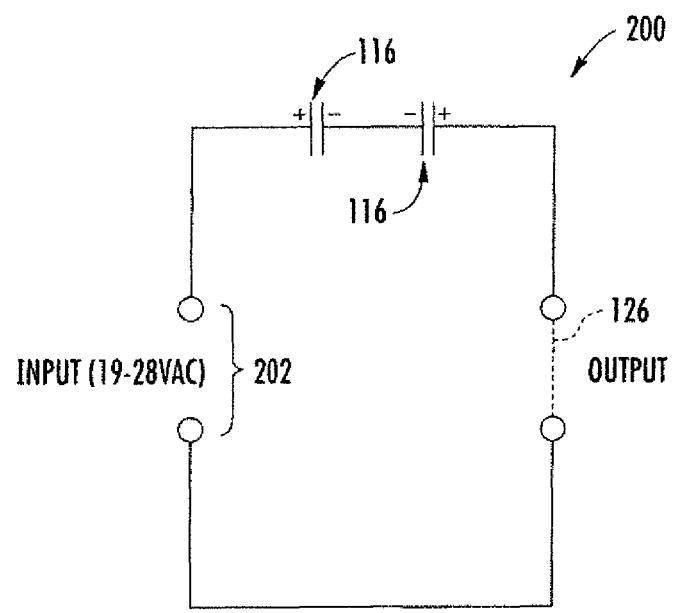
FIG. 2 illustrates the alternating current (AC) voltage dividing circuit of the exemplary actuator assembly of FIG. 1.

Referring now to FIG. 2, an exemplary embodiment of an electrical circuit 200 for use with the actuator assembly of the present invention is illustrated. Specifically, the circuit of FIG. 2 comprises a voltage divider circuit that utilizes the impedance of the SMA filament 126 in combination with a capacitive element (for example, the two capacitors 116 in series as shown) as part of the electrical circuit. It will be appreciated that other components (such as resistors, inductors, capacitors, diodes, potentiometers, etc.) may be used within, or in conjunction with the circuit shown, depending on the particular application. The circuit 200 comprises an input 202 that is, in the illustrated embodiment, coupled to an existing irrigation circuit/source designed for use with electric solenoid-type actuators. Because electric solenoid-type actuators require much more power to operate then is necessary for an SMA filament, the power levels seen by the SMA filament 126 need to be regulated in order prevent the SMA filament from burning up due to excessive current (whether rectified as a DC voltage or as a standard AC voltage as shown).

Herein lies a salient advantage of the voltage divider circuit 200 utilized in the SMA actuator assembly 100 of FIG. 1. That is, the actuator assembly of FIG. 1, when utilized with the circuit of FIG. 2, can readily be utilized with existing electrical infrastructure so as avoid the need to reconstruct or replace costly power supply lines, controllers and the like in irrigation applications; it can be retrofit into legacy infrastructure directly. In addition, the circuit 200 of FIG. 2 is relatively cost effective and simple, thereby obviating the need to utilize costlier solutions (such as step-down transformers and the like), which may eliminate any cost advantage realized by substituting an SMA actuator assembly in place of a prior art solenoid-type device, and which may lead to reduced reliability due increased complexity.

It is further recognized that prior art solenoid type devices draw significantly more current than an actuator driven by an SMA filament, such as that described herein. Accordingly, a system which replaces solenoid-type actuators with SMA-driven actuators consumes much less current (I), resulting in an overall lower amount of power consumption and $I^2R$ losses ($P=IV=I^2R$), as well as providing the ability to place a larger number of SMA actuator assemblies on any given power supply line. For example, a typical prior art implementation might be able to utilize five (5) or six (6) solenoid-type actuator devices on a given line (due in large part to the combined current consumption of the devices). However, the use of the SMA actuated devices described herein allows for, in an exemplary implementation, two to three times the amount of devices on a given line than would otherwise be possible with a solenoid-type actuator device. As yet another alternative, the circuit 200 can be obviated altogether when utilized in systems (such as an exemplary photovoltaic system described subsequently herein), which don't necessitate a reduced level of current as applied to the SMA filament (or where actuation of the filament is provided by a non-electrical heat source, such as infrared radiation of the heat of the fluid being valved itself).

Referring to FIG. 4, another embodiment of an actuator assembly 400 is shown and described in detail. Similar to the actuator assembly of FIG. 1 discussed previously herein, the embodiment of FIG. 4 is intended as a replacement for a solenoid assembly mountable on, for example, existing irrigation valves. The actuator assembly of FIG. 4 includes an actuator housing 410 that is shaped and sized so as to be compatible with prior art solenoid actuator assemblies, although this capability is by no means a requirement. Moreover, while a substantially hexagonal outer housing 410 or shape is shown for the device 400, it is recognized that any number of other shapes and profiles may be used consistent with the invention.

A valve interface 414 acts as a mating interface to the host valve to which the assembly 400 is ultimately mounted. In the illustrated embodiment of FIG. 4, the valve interface includes threads integrally molded into the housing 410. These threads are sized so as to, in an exemplary implementation, be compatible with existing irrigation valves so as to, inter alia, facilitate retrofit. Terminal conductors (hidden from view in FIG. 4, but illustrated as element 494 in FIG. 4H discussed below) protrude from the housing 410, and are intended to interface with an external power source. Similar to that described previously herein, these terminal conductors can interface with existing high current power sources (such as exemplary 24 VAC irrigation supply lines), or alternatively with relatively low current power sources such as batteries or renewable power sources (e.g., a photovoltaic cell). While primarily envisioned as interfacing with external power sources, it is further recognized that these terminal conductors could be obviated in lieu of internally mounted power sources (such as batteries, indigenous solar cells, inductive power transfer/charging systems, and the like).

FIG. 4A illustrates various sub-assemblies within the actuator assembly 400 of FIG. 4 that are visible with the actuator housing removed from view. The actuation sub-assembly 420 provides the actuation mechanism for the actuator assembly. The circuit sub-assembly 480 provides the electrical power interface that powers the actuation sub-assembly, while the interface sub-assembly 460 is the portion of the actuator that interfaces with the valve (not shown). These sub-assemblies are now described in detail.

Figure 4B:
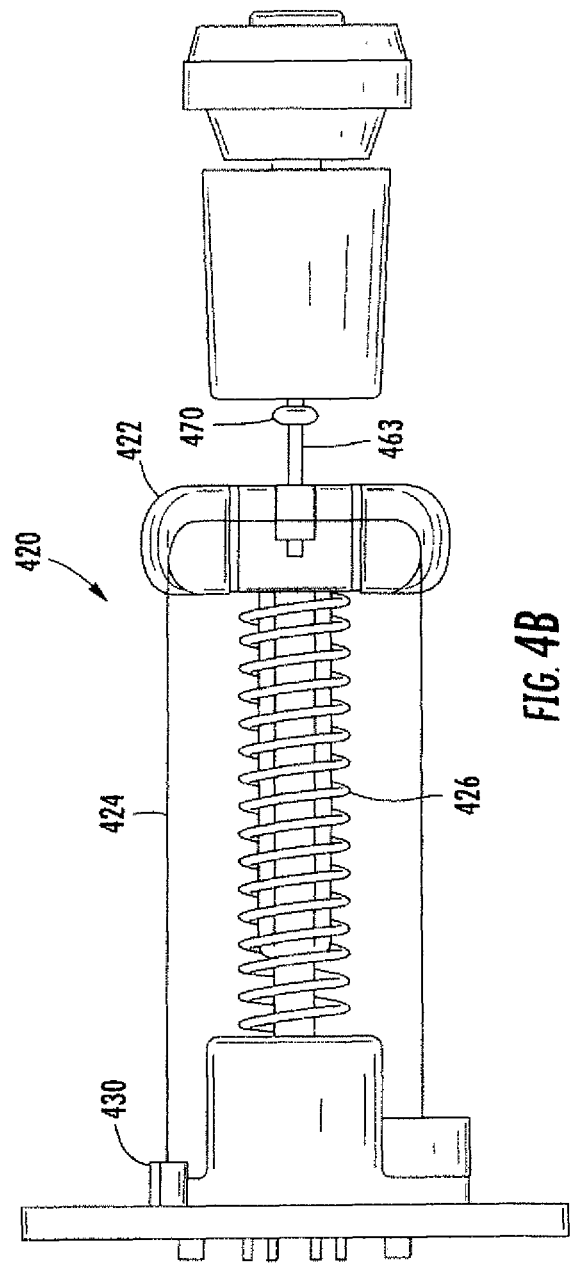
FIG. 4B illustrates a top view of the actuation sub-assembly of the actuator assembly of FIG. 4.

FIG. 4B illustrates the actuation sub-assembly 420 in more detail. Specifically, the components which make up the actuation sub-assembly include SMA crimping elements 430 coupled to an SMA filament 424. These SMA crimping elements are, in an exemplary embodiment, secured to the SMA filament via a serpentine-like channel crimp of the type disclosed in co-owned U.S. Pat. No. 7,650,914 filed Jun. 22, 2006 and entitled "Apparatus & Methods for Filament Bonding & Manufacturing", the contents of which were previously incorporated herein by reference in its entirety, although it will be appreciated that other types of crimps (and in fact other types of mechanical joints) may be used consistent with the invention, such as e.g., welded or brazed joints. The aforementioned serpentine-like channel crimps advantageously permit, inter alia, the crimping of very fine-gauge wire without damage thereto, and without any significant "creep". This solution also allows for very short-throw applications (i.e., short length filaments), since any significant creep in such short-length filaments can preclude actuation. Hence, the actuator assembly 400 of the invention can be made more compact and lower cost using such crimp solutions, although not a requirement of practicing the invention.

The SMA filament 424 is routed around the far end 428 of the actuator rod 422, and contracts when a current is applied. The far end of the actuator rod (FIG. 4D) minimizes the risk of damage to the SMA filament during expansion/contraction by implementing one or more damage minimizing features including: (1) including a radius on the far end of the actuator rod that is greater then or equal to about twenty (20) times the diameter of the SMA filament; (2) polishing the area of the mold which ultimately forms the SMA filament engaging surface; and (3) utilizing a high temperature material (preferably one with good lubricity properties) that will not deform or melt when the SMA filament is heated via the application of current. The SMA filament is in the illustrated embodiment routed once around the far end of the actuator rod, although it is appreciated that the routing of the filament can be varied (see, e.g., discussion with regards to FIGS. 1-1J above) in order to vary the amount of actuation required for the assembly. While a low-friction surface is illustrated, it is appreciated that other systems can be utilized, such as the pulley element system described previously herein which minimize the risk of damage to the SMA filament during expansion/contraction.

The diameter size of the filament 126 can be readily modified based on design parameters of the actuator assembly. Smaller diameter filaments are faster to react to the application of current, and require less energy to activate. Larger diameter SMA filaments tend to require longer reaction times and higher levels of applied current in order to operate; however, the larger diameter filaments apply larger amounts of force. Multiple-strand filaments may also be used consistent with the invention if desired.

In an exemplary embodiment, the SMA filament used in the actuator assembly of FIG. 4 will be on the order of about four thousandths of an inch (0.004 in [0.1 mm]) or smaller. Such an embodiment is particularly useful in existing prior art irrigation systems in which multiple actuator assemblies (and associated valves) are used inline with one another. Existing irrigation controllers contain transformers with a predetermined current supply capacity. Accordingly, the lower the current consumption of the SMA filament, the more actuators can be installed with a given controller. For example, in residential application it is common to have four (4) actuator assemblies used inline a single irrigation controller while commercial applications can have as many as forty (40) actuator assemblies used inline with one another.

A compression spring 426 is disposed about the shaft of the actuator rod, and is configured to return the actuator rod into its non-actuated position after the SMA filament is no longer powered. While the use of a compression spring is exemplary, it is appreciated that bistable mechanisms such as those described in co-owned and co-pending U.S. patent application Ser. No. 12/539,521 filed Aug. 11, 2009 and entitled "Multi-Stable Actuation Apparatus and Methods for Making and Using the Same", the contents of which are incorporated herein by reference in its entirety, may readily be substituted to, inter alia, reduce power consumption and/or enhance actuation travel. Yet other techniques for effecting the desired return functionality may be used as well.

Figure 4C:
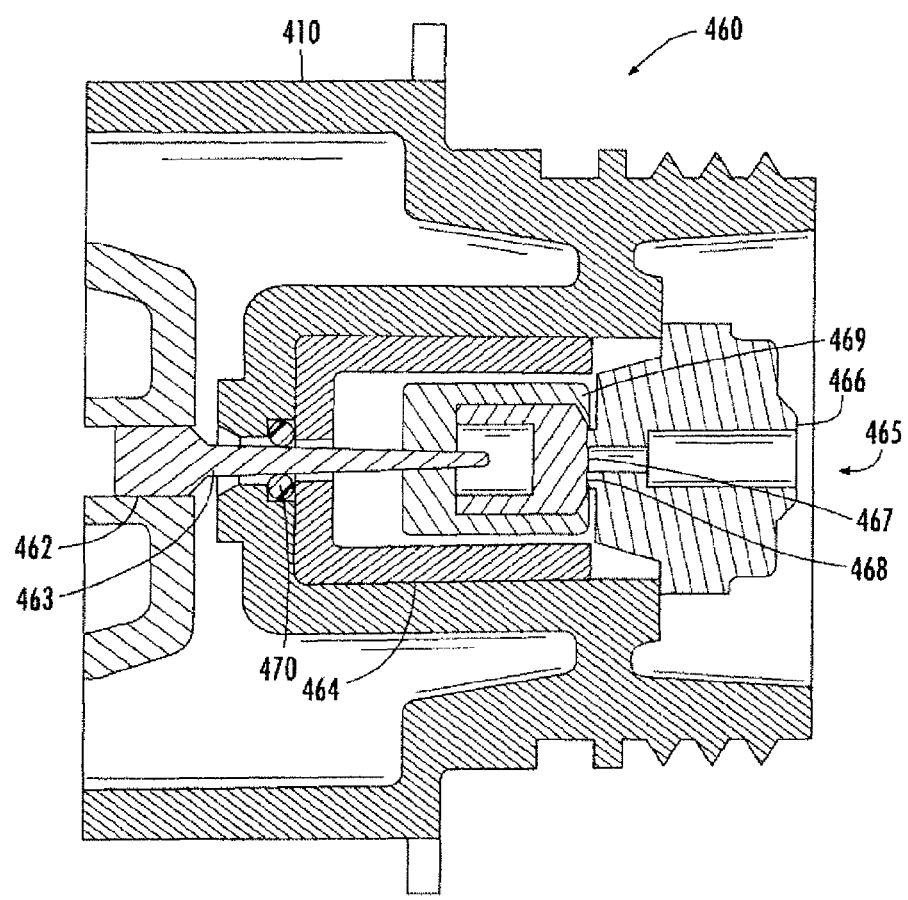
FIG. 4C illustrates a cross-sectional view of the interface sub-assembly of the actuator assembly of FIG. 4.

Referring now to FIG. 4C, a cross sectional view of the interface sub-assembly 460 is shown and described in detail. See also FIGS. 4E and 4F for perspective views of various components discussed subsequently herein as part of the interface sub-assembly. The interface sub-assembly includes a fluid isolation element 464 with an associated O-ring 470. The combination of these two elements prevents the intrusion of fluids (such as water, although it is appreciated that the apparatus is in no way limited to water-based applications) from entering into the housing 410, and causing difficulties with sensitive components on the "dry side" of the actuator assembly (or permitting deleterious or even hazardous fluids to potentially escape from the actuator via the dry side). These difficulties include e.g., potential electrical problems such as shorting and/or shock hazards, and mechanical problems that result from the intrusion of corrosive fluids onto sensitive mechanical or electrical components. Notwithstanding, it will be appreciated that the fluidic boundary offered by the O-ring 470 and isolation element 464 of the illustrated embodiment may be differently located, and/or accomplished by other types of components (such as e.g., compression fittings, silicone or other gasket-type materials, etc.).

The valve shaft 463 which is mechanically coupled to the actuator rod by valve shaft interface 462 interfaces with a plunger comprised of an outer plunger 469 and inner plunger 468. The outer plunger is preferably manufactured from a relatively hard plastic with good lubricity so as to provide a good surface for actuation. The outer plunger also will interface with the valve shaft, in one exemplary embodiment, via a press fit connection that is aided by the use of a relatively hard plastic. While a press fit is exemplary, it is appreciated that other joining techniques can be used such as the use of adhesives, threads or other suitable methods. The inner plunger is preferably made from a resilient material (such as an elastomer) so as to facilitate the seal with the pilot hole. The inner plunger can also be made replaceable so that it can be removed from its position within the outer plunger as it wears over time. The inner plunger further includes a nipple 467 that is configured to interface with a pilot hole (and associated fluid inlet 465) that is part of the valve interface 466. The outer plunger is, in one alternate embodiment, outfitted with a hole or aperture (not shown) on the valve shaft side of the outer plunger so as to equalize fluid pressure on either side of the inner plunger thereby helping to maintain its position within the outer plunger. The inner and outer plungers are actuated via either the SMA filament or the compression spring in the illustrated embodiment.

Figure 4D:
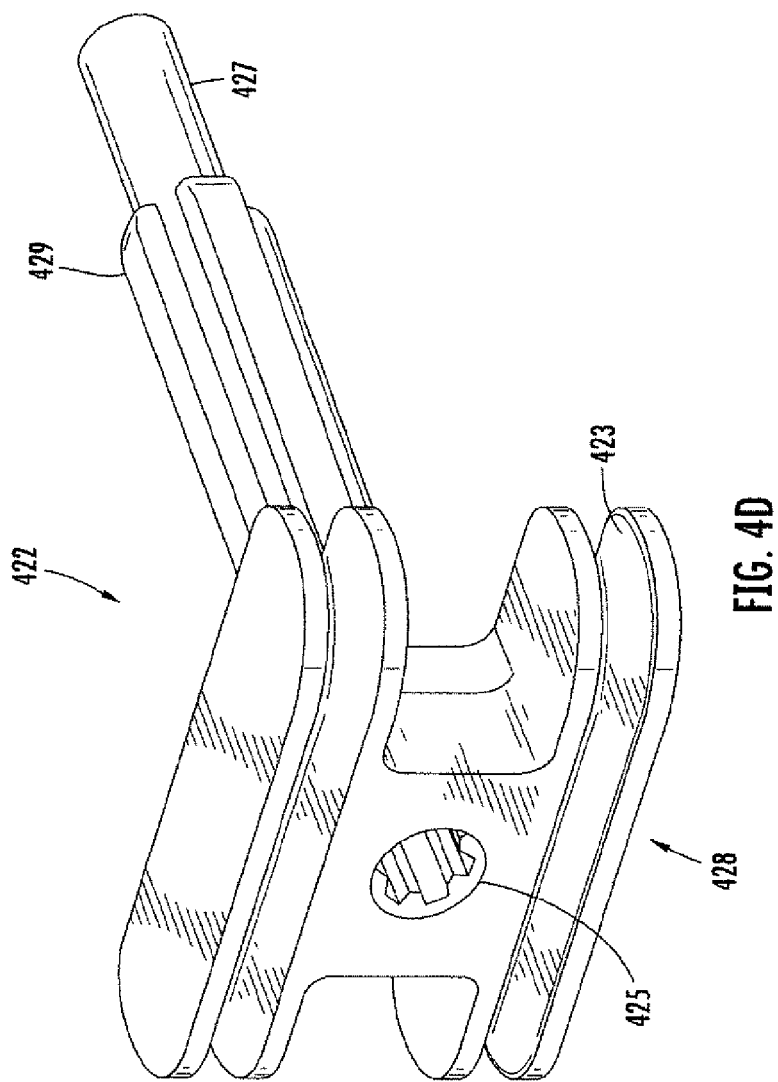
FIG. 4D illustrates a perspective view of the actuator rod of the actuator assembly of FIG. 4.
Figure 4E:
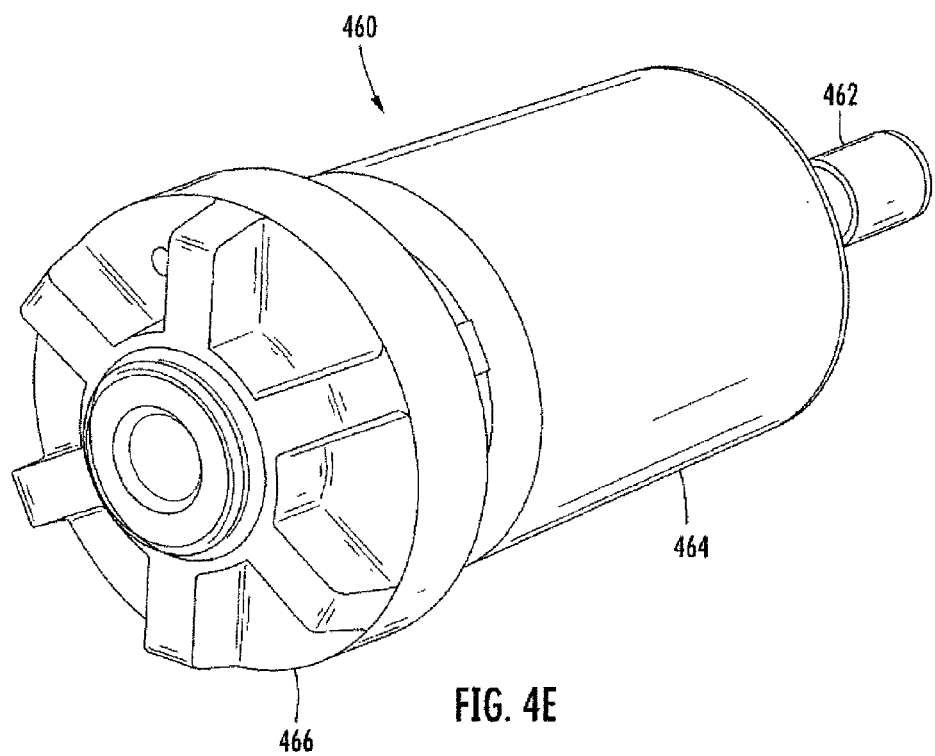
FIG. 4E illustrates a perspective view of the interface sub-assembly of the actuator assembly of FIG. 4.
Figure 4F:
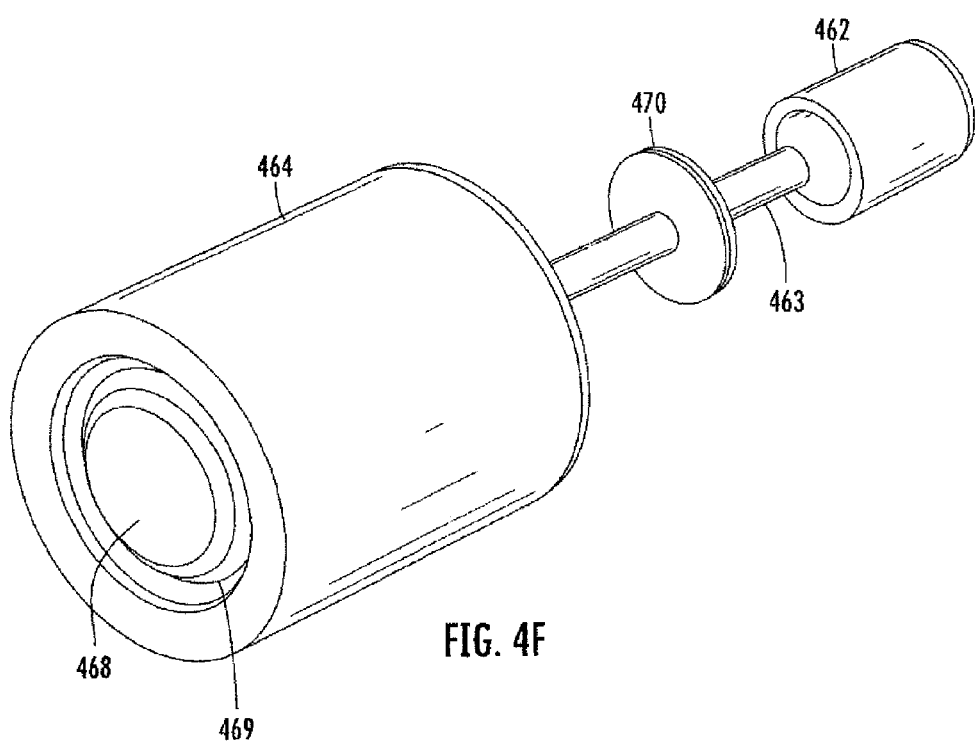
FIG. 4F illustrates a perspective view of the interface sub-assembly of FIG. 4E, with the valve interface removed from view.

FIG. 4D illustrates a perspective view of the actuator rod 422 of the embodiment of FIG. 4. The actuator rod includes a shaft slide 427 which permits the actuator rod to actuate upon energizing the SMA filament. Compression spring engaging features 429 located on the shaft maintain the compression spring substantially centered about the centerline of the actuator rod. The actuator rod also includes a valve shaft interface cavity 425 that is sized to accommodate the valve shaft interface (462, FIG. 4C).

Figure 4G:
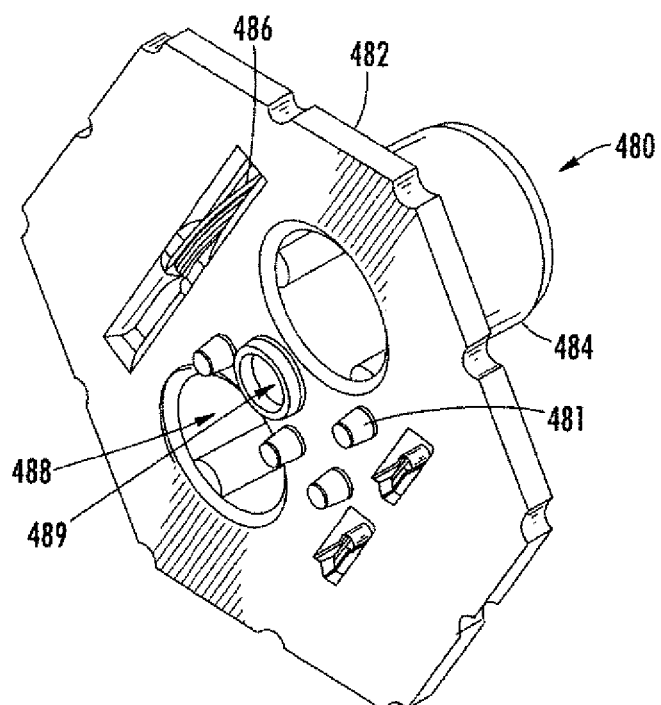
FIG. 4G illustrates a perspective view of the circuit base of the actuator assembly of FIG. 4.

Referring now to FIG. 4G, the circuit sub-assembly 480 is illustrated with the circuit substrate (FIGS. 4H and 4I) removed from view. The circuit sub-assembly in FIG. 4G includes a circuit base 482 formed preferably from a non-conductive polymer base. The circuit base includes a pair of electronic component receiving features 484 that form electronic component cavities 488, which in the illustrated embodiment are used to house the capacitors illustrated in FIG. 4H. The circuit base also includes a number of circuit substrate interface posts 481 used for locating and/or securing the circuit substrate. A shaft slide guide 489 is configured to receive the shaft slide on the actuator rod, and includes a substantially frictionless surface that allows the actuator rod to slide freely within the shaft slide guide. Similar to the SMA filament grooves illustrated in FIG. 4D, the circuit base also includes its own SMA filament groove 486 so that the SMA filament can be routed in a serpentine like pattern such as that shown in FIG. 4A.

Figure 4H:
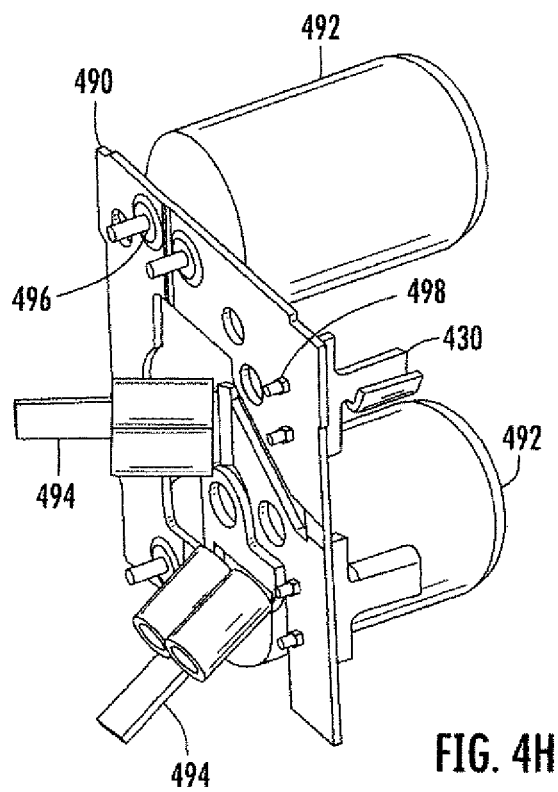
FIG. 4H illustrates a perspective view of the circuit substrate assembly of the actuator assembly of FIG. 4.

FIG. 4H illustrates the circuit substrate 490 to be mounted onto the circuit base of FIG. 4G. The capacitors 492 are received within the electronic component cavities of the circuit base, while the SMA crimping elements 430 previously described provide an electro-mechanical interface to the circuitry (such as that shown in FIG. 2) present on the circuit substrate. The SMA crimping elements 430 are secured to the circuit substrate at the SMA crimping element interface 498 via the use of standard processing techniques such as soldering and the like. Similarly, the capacitors are secured at the capacitor interface 496. The terminal clamps 494 are coupled to a power source that ultimately drives the contraction of the SMA filament.

Figure 4I:
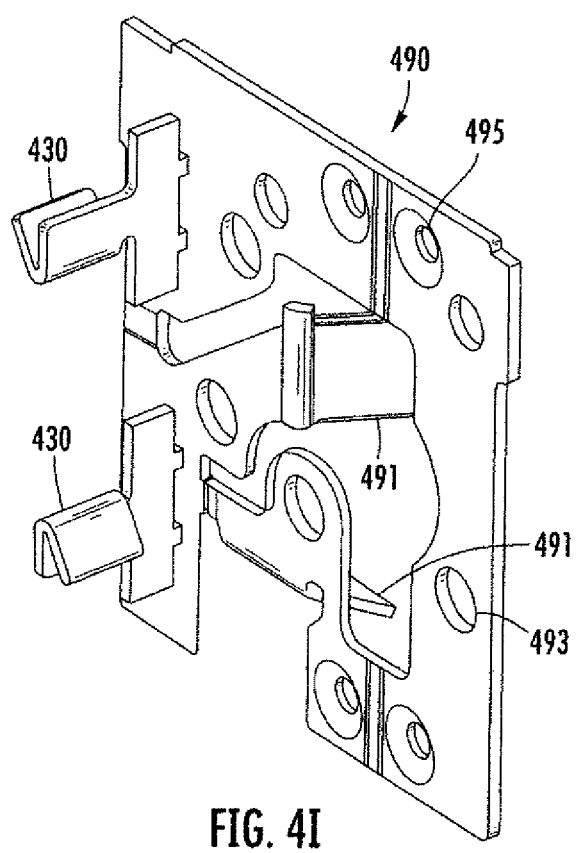
FIG. 4I illustrates a perspective view of the circuit substrate of the actuator assembly of FIG. 4.

FIG. 4I illustrates the opposing surface of the circuit substrate with the capacitors removed from view, and includes a number of electronic component interface apertures, terminal clamp interfaces 491 and circuit substrate interface apertures 493.

Methods of Manufacture and Use—

Exemplary methods of manufacture and use of the actuator assembly of the present invention are now described in detail.

Figure 3:
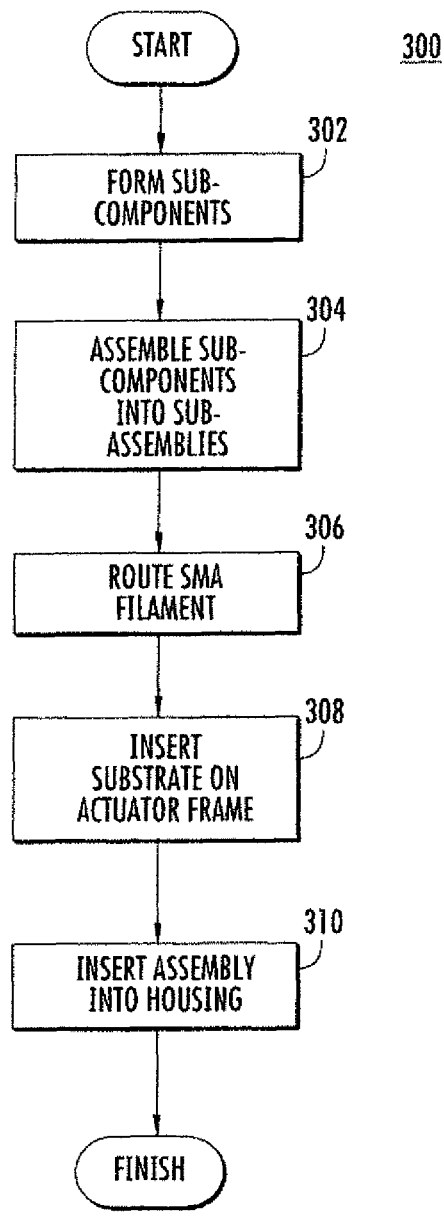
FIG. 3 illustrates a process flow of an exemplary method of manufacturing a exemplary actuator assembly in accordance with the principles of the present invention.

Referring to FIG. 3, one embodiment of the method for manufacturing 300 the actuator assembly of for example, FIGS. 1 and 4 is shown and described in detail. At step 302, the sub-components utilized in the actuator assembly are formed or obtained. These components include in one embodiment the actuator frame 120, actuator slide element 140 and housing cover 110 that are preferably formed from a polymer (e.g., polyethylene, fluorinated polymer such as ETFE, etc.) via an automated manufacturing process such as a well known injection molding process and the like, although it is recognized that other materials and manufacturing processes and methods can be readily substituted with ease, as would be appreciated by one of ordinary skill given the presence disclosure. Items such as the SMA clip anchors, pulley elements and the fluid isolation element are made from formed metal stampings (e.g. progressive stamping, metal drawing, etc.), while other items such as the spring, SMA filament, magnets, O-rings, etc. are formed using well known techniques, or otherwise acquired from a third party manufacturer. The substrate is preferably formed using a photochemical etching process that leaves conductive traces on the surfaces of an otherwise non-conductive substrate as is conventional in the electronic arts, although it will be appreciated that other configurations (e.g., flexible substrates, electrically conductive ink, etc) may be used as well. In addition, metal stampings placed into non-conductive headers or substrates or even bare metal wires could be substituted if desired.

At step 304, the various components formed or otherwise acquired at step 302 (e.g. those components described herein with respect to FIGS. 1-1J and 4-4I) are assembled into respective sub-assemblies. These subassemblies include, for example: (1) the SMA filament sub-assembly, which includes respective ends of the SMA filament attached to the SMA clip anchors previously described herein; (2) the actuator slide element subassembly, which includes the actuator slide element, fluid isolation element, dry-side magnet and pulley elements; (3) the frame sub-assembly, which includes the frame and an additional pulley element in the illustrated embodiment; (4) the plunger sub-assembly, which includes the plunger and the wet-side magnet; (5) the substrate assembly, which includes the substrate and the electronic components (e.g. the capacitors illustrated in FIG. 1B) that are mounted thereon; and (6) the housing sub-assembly, which includes such items as the housing cover and the quacking element, etc. Alternatively, these sub-assemblies include; (1) the actuation sub-assembly (FIG. 4B); (2) the interface sub-assembly (FIG. 4E); and (3) the circuit sub-assembly (FIG. 4G)

At step 306, the SMA subassembly or SMA filament is routed onto the actuator frame or actuator rod (FIG. 4D). This is accomplished by, for example, compressing the compression spring located around the actuator rod, routing the SMA filament onto the various pulley elements and subsequently inserting the SMA clip anchors into the respective SMA anchor slots located on the actuator frame. In an exemplary embodiment, care is taken to ensure that the SMA filament is not twisted during installation so as to ensure the structural integrity of the SMA filament during normal use.

At step 308, the substrate is assembled onto the actuator frame or alternatively, onto the circuit base as described in FIG. 4G. In the embodiment described with respect to FIG. 1, terminals that were pre-installed on the substrate engage the SMA clip anchors (FIG. 1J) thereby forming an electrical connection with the SMA filament. An advantage of the exemplary actuator assembly embodiment described herein lies in the modular nature of the substrate that is assembled onto the actuator frame. Namely, that the substrate can be installed and removed quite easily. Accordingly, different electronic circuits on the substrate can be swapped out or otherwise incorporated on the same or similar actuator assemblies. This is useful, for example, in cases where irrigation systems are being retrofitted with the SMA actuator assemblies illustrated in FIG. 1, which replace prior art solenoid actuator assemblies. As the existing power supply lines disposed on an irrigation system (such as a golf course, university campus, etc.) are adapted to supply power to a solenoid actuator whose consumption requires a lot more power then is necessary (or even desirable) for the SMA actuator assembly (such as those described herein), the SMA actuator assembly can include a circuit like that shown in FIG. 2 which allows the SMA actuator assembly to function on existing power supply infrastructure. At a later time if the irrigation system is upgraded (such as if the existing power supply is replaced by an exemplary photovoltaic power source), the substrate utilized on the actuator assembly can be replaced with a more suitable electronic circuit, without having to replace or throw away the existing actuator assembly.

Moreover, repair or replacement (if required) of the electronic circuit can be effected rapidly and with ease, such as where an electronic component fails, or conversely where an actuator assembly fails mechanically, yet the substrate and circuitry are still usable.

In addition to leveraging the modular nature of the substrate to retrofit existing irrigation systems, the actuator assembly of the present invention may simply incorporate a number of differing electronic circuits for various systems, while utilizing the same or similar components for the remainder of the actuator assembly. For instance, in one embodiment, a single circuit adapted for a particular use is disposed on the substrate in a space efficient manner, thereby allowing the substrate (and hence the actuator assembly as a whole) to be as small as possible. However, in other variants, the substrate can be enlarged (and or both sides of the substrate used to carry circuitry) so as to accommodate two or more different circuits for different applications/voltage levels. In yet another variant, one or more components on the circuit board can be made "field-configurable", such that two or more applications can be supported by a substantially unitary circuit upon reconfiguration of part of that circuit (e.g., moving two wire terminals from one receptacle to another, thereby bypassing or introducing components into the circuit, etc.)

At step 310, the actuator assembly is fit into the housing. The housing again can be modular in nature so that the underlying actuator assembly can be utilized in any number of differing actuator systems with differing valve interfaces.

It will be recognized that while certain aspects of the invention are described in terms of specific design examples, these descriptions are only illustrative of the broader methods of the invention, and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An actuator configured to operate in a system configured to be operated by a different type of actuator mechanism, comprising:
    an electrically activated actuator assembly; and
    an electronic circuit configured to condition electrical power provided by the system for the different type of actuator mechanism so as to be suitable for use with the electrically activated actuator assembly;
    wherein the electronic circuit comprises a voltage divider circuit that utilizes an impedance of at least a portion of the electrically activated actuator assembly in combination with a capacitive element to produce an output voltage for an actuating portion of the electrically activated actuator assembly that is less than an input voltage as the electrically activated actuator assembly consumes less electrical power than the different type of actuator mechanism; and
    wherein the actuator is configured to physically replace the different type of actuator mechanism.

2. The actuator of claim 1, wherein:
    the electrically activated actuator assembly comprises at least one shape memory alloy (SMA) filament; and the different type of actuator mechanism comprises a solenoid-based mechanism adapted for use with the electrical power provided by the system to the actuator assembly without said conditioning.

3. The actuator of claim 1, wherein the electrically activated actuator assembly and the electronic circuit are housed together in a common housing.

4. The actuator of claim 3, further comprising a plunger that is directly actuated by the electrically activated actuator assembly via the use of a valve shaft.

5. The actuator of claim 4, further comprising an actuator rod having a shape memory alloy (SMA) filament routed thereon.

6. The actuator of claim 5, wherein the SMA filament is routed around an end of the actuator rod at least two times.

7. The actuator of claim 6, wherein at least one of first and second ends of the SMA filament are coupled to the electronic circuit via at least one SMA crimping element.

8. The actuator of claim 1, further comprising a valve coupled to said electrically activated actuator assembly.

9. The actuator of claim 8, further comprising a plunger that is directly actuated by the electrically activated actuator assembly via the use of a valve shaft.

10. The actuator of claim 9, further comprising an actuator rod having said at least one SMA filament routed thereon.

11. The actuator of claim 10, wherein the SMA filament is routed around an end of the actuator rod at least two times.

12. An actuator, comprising:
a housing;
an electrically activated actuator assembly disposed within the housing, the electrically activated actuator assembly comprising a shape memory alloy (SMA) filament;
an electronic circuit disposed within the housing configured to condition electrical power from a power source for the electrically activated actuator assembly;
a mating interface to a valve assembly; and
an actuator rod disposed within the housing and having the SMA filament attached thereto and wherein a compression spring is disposed at least partly around the actuator rod;
wherein the electronic circuit comprises a voltage divider circuit configured to produce an output voltage for the electrically activated actuator assembly that is less than an input voltage as the electrically activated actuator assembly consumes less electrical power than a solenoid actuator assembly typically used with the power source; and
wherein the voltage divider circuit is configured to interface with the power source configured to power the solenoid actuator assembly so as to provide a reduced voltage for the SMA filament, the actuator in combination with the voltage divider circuit is configured to replace the solenoid actuator assembly.

13. The actuator of claim 12, wherein the compression spring is configured to place the actuator rod in a return state after actuation of the actuator rod by the SMA filament.

14. The actuator of claim 13, wherein the electronic circuit is disposed at least in part on a circuit base element, the circuit base element comprising a slide guide configured to receive an end of the actuator rod.

15. The actuator of claim 14, wherein the circuit base element comprises a polymer and the slide guide comprises a substantially frictionless surface.

16. The actuator of claim 12, wherein the SMA filament is disposed about an end of the actuator rod.

17. The actuator of claim 16, wherein the actuator rod further comprises a valve shaft coupled to the actuator rod by a valve shaft interface.

18. The actuator of claim 17, wherein the valve shaft interface further comprises a plunger, the plunger comprised of an outer plunger and an inner plunger.

19. The actuator of claim 18, wherein the outer plunger comprises a polymer having a lubricity suitable for actuation while the inner plunger comprises a resilient material configured to facilitate sealing of a pilot hole.

20. An actuator, comprising:
a housing;
an electrically activated actuator assembly disposed within the housing, the electrically activated actuator assembly comprising a shape memory alloy (SMA) filament;
an electronic circuit disposed within the housing configured to condition electrical power for the electrically activated actuator assembly:
a mating interface to a valve assembly; and
an actuator rod disposed within the housing and having the SMA filament attached thereto and wherein a compression spring is disposed at least partly around the actuator rod;
wherein the SMA filament is disposed about an end of the actuator rod, the actuator rod further comprising a valve shaft coupled to the actuator rod by a valve shaft interface; and
wherein the valve shaft interface further comprises a plunger, the plunger comprised of an outer plunger having a lubricity suitable for actuation and an inner plunger comprising a resilient material configured to facilitate sealing of a pilot hole.

21. The actuator of claim 20, wherein the actuator is configured to physically replace a solenoid assembly mountable with existing irrigation valves.

22. The actuator of claim 21, wherein the SMA filament is four thousandths of an inch or smaller.

23. The actuator of claim 22, wherein the outer plunger comprises an aperture on a side with the valve shaft so as to equalize fluid pressure on either side of the inner plunger.

* * * * *